(12) United States Patent
Davis et al.

(10) Patent No.: US 12,100,990 B2
(45) Date of Patent: Sep. 24, 2024

(54) BACKUP POWER TRANSFER METER

(71) Applicant: PACIFIC GAS AND ELECTRIC COMPANY, San Francisco, CA (US)

(72) Inventors: Earle Davis, Walnut Creek, CA (US); Alan Jones, Berkeley, CA (US); Alex Yan, Berkeley, CA (US); Quoc Hoang, Walnut Creek, CA (US); Bonnie Tong, San Francisco, CA (US)

(73) Assignee: PACIFIC GAS AND ELECTRIC COMPANY, Oakland, CA (US)

( * ) Notice: Subject to any disclaimer, the term of this patent is extended or adjusted under 35 U.S.C. 154(b) by 0 days.

(21) Appl. No.: 17/550,222

(22) Filed: Dec. 14, 2021

(65) Prior Publication Data
US 2022/0255342 A1     Aug. 11, 2022

Related U.S. Application Data

(60) Provisional application No. 63/253,820, filed on Oct. 8, 2021, provisional application No. 63/197,762, filed on Jun. 7, 2021, provisional application No. 63/147,055, filed on Feb. 8, 2021.

(51) Int. Cl.
*H02J 9/06*     (2006.01)
*H02J 3/38*     (2006.01)
*H02J 7/00*     (2006.01)

(52) U.S. Cl.
CPC .............. *H02J 9/06* (2013.01); *H02J 3/38* (2013.01); *H02J 7/0013* (2013.01); *H02J 7/00309* (2020.01); *H02J 7/0047* (2013.01); *H02J 7/0063* (2013.01); *H02J 2300/10* (2020.01); *H02J 2300/24* (2020.01)

(58) Field of Classification Search
CPC .. H02J 9/06; H02J 7/00309; H02J 3/38; H02J 7/0013; H02J 7/0047; H02J 7/0063; H02J 2300/10; H02J 2300/24
USPC ........................................... 307/65
See application file for complete search history.

(56) References Cited

U.S. PATENT DOCUMENTS

| | | | | |
|---|---|---|---|---|
| 5,994,794 A * | 11/1999 | Wehrlen | ................ | H02J 9/066 307/64 |
| 2003/0034693 A1* | 2/2003 | Wareham | ............... | H02J 9/061 307/64 |
| 2010/0181177 A1* | 7/2010 | Young | ................... | H01H 19/38 200/336 |
| 2011/0004357 A1* | 1/2011 | Mathiowetz | ........... | H02J 3/381 700/295 |
| 2013/0009788 A1* | 1/2013 | Langenberg | .......... | G01D 4/002 340/870.02 |

(Continued)

*Primary Examiner* — Michael R. Fin
(74) *Attorney, Agent, or Firm* — Greenberg Traurig, LLP

(57) ABSTRACT

The disclosure is directed to a novel utility meter with an integrated backup power transfer system. In some embodiments, the system is capable of sensing and switching between multiple power sources. In some embodiments, the system is configured to supply power from multiple backup power sources in parallel. In some embodiments, the system is configured to record and/or transmit data usage and operational profiles, such as voltage and current from one or more power sources. In some embodiments, the system is configured to eliminate the need to install separate junction boxes or panels to meet the wire requirements of various municipalities.

20 Claims, 23 Drawing Sheets

(56) References Cited

U.S. PATENT DOCUMENTS

2015/0316944 A1\* 11/2015 Thellend ................ G05B 15/02
                                                    700/292
2017/0366017 A1\* 12/2017 Clay ..................... H02J 7/1423
2020/0161862 A1\*  5/2020 Rubens .................. H02J 9/062

\* cited by examiner

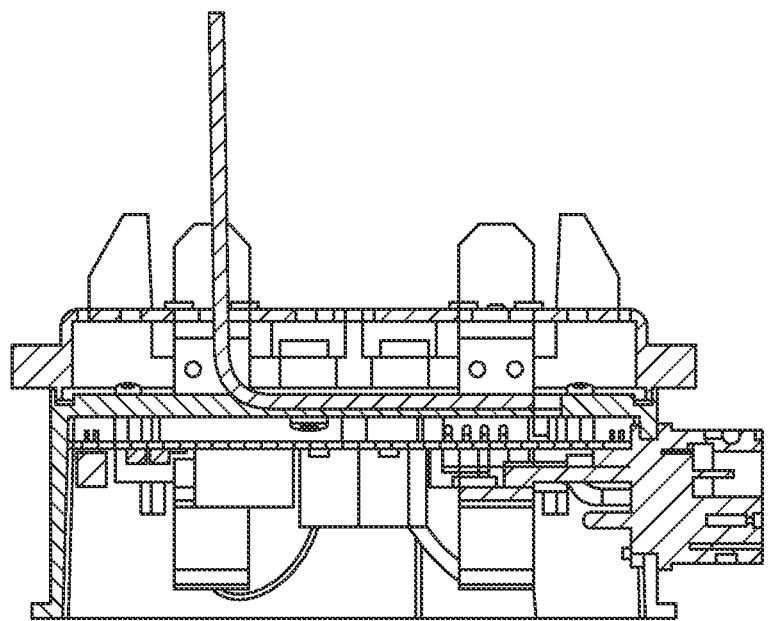
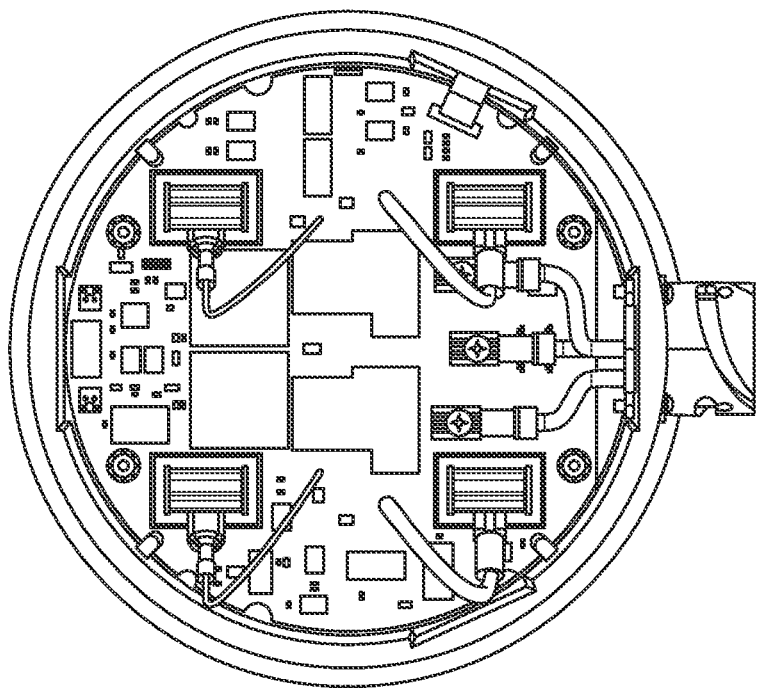
FIG. 9

| ITEM NO. | PART NO. | DESCRIPTION | MFR PART NO. | QTY. |
|---|---|---|---|---|
| 1 | 600-0041 | UDM MEMBRANE PANEL | 600-0041 | 1 |
| 2 | 600-0040 | MODIFIED METER BASE HOUSING, 2.40in, GREY | 512-3002-000 | 1 |
| 3 | 921-0029 | GTC RECEPT CABLE | 921-0029 | 1 |
| 4 | 31112 | 8 AWG, NO. 6 RING SIZE NON-INSULATED RING TERMINAL | | 1 |
| 5 | 3213-8/133-0-0020 | WIRE STRND 8 AWG BLACK, HI-FLEX, 20"LG | 3213-8/133-0-0020 | 1 |
| 6 | 7479K13-0020 | WIRE STRND 8 AWG WHITE, SILICONE RUBBER, 20"LG | 7479K13-0020 | 1 |
| 7 | 410-701E-0018-0005 | WIRE STRND 18 AWG BLUE 0.050 OD 600V MIL-W-1 6878, 5"LG | 1857-BL005 | 1 |
| 8 | 410-901E-0018-0005 | WIRE STRND 18 AWG GREY 0.050 OD 600V MIL-W-16878, 5"LG | 83009 008100 | 1 |
| 9 | 326-213C-0000-0000 | 22-18 AWG FEMALE TERMINALS, INSULATED, 250 X .032 TAB | 2-520184-2 | 2 |
| 10 | 912-0535-0001 | PGE DISCONNECT PCB | 912-0535-0001 | 1 |
| 11 | 640907-1 | 6.35mm X 0.81mm PUSH-ON TERMINALS PIDG RECPT 12-10 AWG, YLW | 640907-1 | 2 |
| 12 | | RECEPT PROTECTIVE CAP, BLACK ANODIZE | 10-580902-20Z | 1 |
| 13 | | PHPMS, ZINC-PLATED STEEL, #4-40 X 0.5 | 90272A110 | 4 |
| 14 | 91075A440 | 18-8 SS MALE-FEM THRDED HEX STANDOFF, 6-32 TO 6-32 | 91075A440 | 4 |
| 15 | 90272A146 | PHPMS, ZINC-PLATED STEEL, #6-32 X 0.375 | 90272A146 | 3 |
| 16 | 511-6250-C000-0000 | NUT LOCK KEP 6-32 X 1/4 WIDE ZPS | 90413A101 | 4 |
| 17 | 511-6250-8000-0000 | HW, NUT, KEP, 4-40, ZP | 90675A005 | 4 |
| 18 | 9B401A439 | HW, PIN, COTTER, 3/32 DIA. X .5 LG, 18-8SS | | 4 |
| 19 | 90272A833 | PHPMS, ZINC-PLATED STEEL, #10-32 X 1 | 90272A833 | 2 |
| 20 | 515-6350-8000-0000 | NUT LOCK W/EXT-TOOTH LOCK WASHER, 10-32 THD ZPS | 90675A195 | 2 |
| 21 | | SOCKET METER STAB WITH BLADE | 312-6025-000 | 4 |
| 22 | 90126A509 | NO. 6, ZINC-PLATED STEEL SAE FLAT WASHER | 90126A509 | 4 |
| 23 | 95345A458 | PAN HEAD PHIL MACHINE SCREW WITH LOCK WASHER | 95345A458 | 4 |
| 24 | 90295A390 | NYLON PLASTIC WASHER, #6 | 90295A390 | 4 |
| 25 | | PHPMS, ZINC-PLATED STEEL, #6-32 X 0.3125 | 90272A145 | 1 |
| 26 | 512-3002-000 | AEP HOUSING BTM, LOW PROFILE | 512-3002-000 | 1 |

FIG. 10

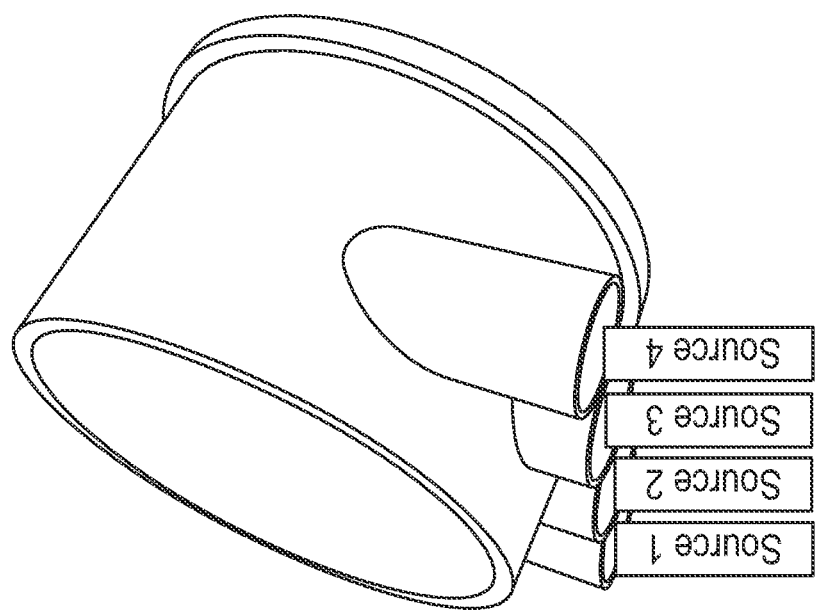
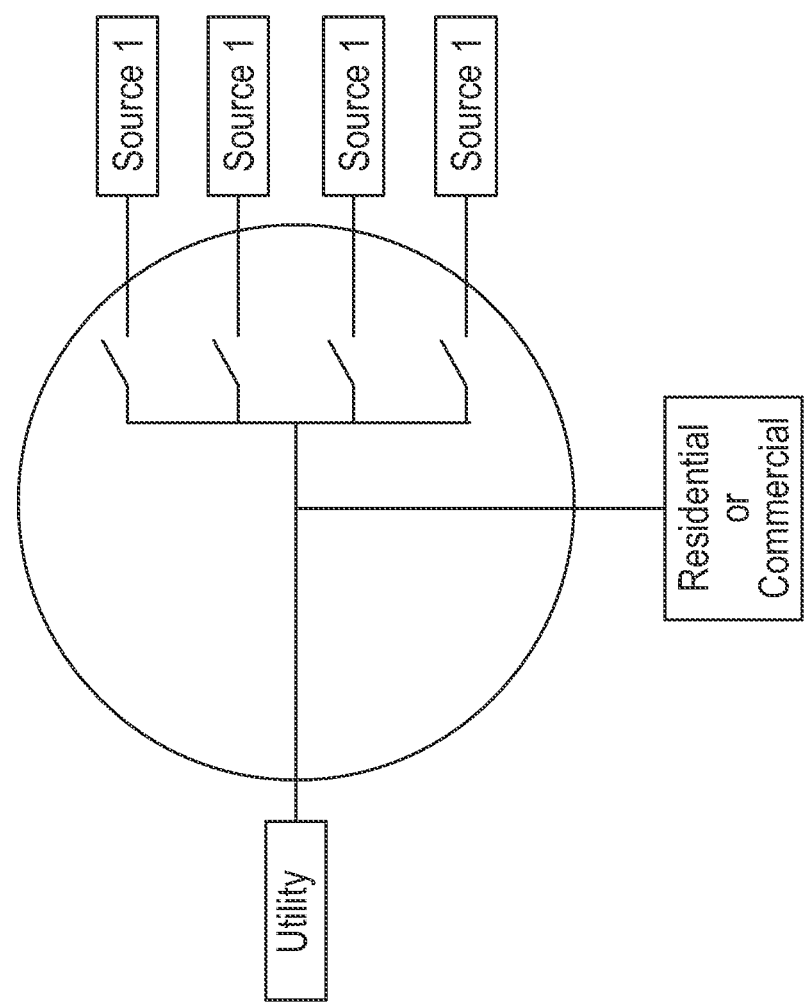
FIG. 17

FIG. 19

BACKUP POWER TRANSFER METER

CROSS REFERENCE TO RELATED APPLICATIONS

This application claims the benefit of and priority to U.S. Provisional Patent Application No. 63/253,820, filed Oct. 8, 2021, U.S. Provisional Patent Application No. 63/197,762, filed Jun. 7, 2021, and U.S. Provisional Patent Application No. 63/147,055, filed Feb. 8, 2021, the entire contents of each of which are incorporated by reference herein.

BACKGROUND

During power outages, it is useful to have a backup power source to provide electricity. Current methods of providing a backup power source involve connecting a backup power source directly to an electrical panel bypassing the electrical meter. However, the current National Electric Code (NEC) for transfer switch connection requires customers installing a separate electric panel to dedicate certain branch circuits to be connected to the backup generator based on the rating of the backup generator or backup power. For customers to be compliant, they must install a new transfer switch and panel as the "correct" installation in FIG. 1 which adds large costs and labor. In addition, there is no way of monitoring energy usage by the backup power source using an electrical meter and/or controlling which backup power source is used by the electrical meter's internal electronics.

Therefore, there is a need for a system that enables a user to connect one or more backup power sources directly to an electrical meter and/or control one or more functions of the one or more backup power sources using the electrical meter.

SUMMARY

In some embodiments, the Backup Power Transfer Meter (BPTM) system (hereafter, the "system") is an economical approach to simplify the NEC interconnection requirement. In some embodiments, the system allows the customers to temporarily power their home using a backup power source (e.g., combustion generator, battery, photovoltaic, electric vehicle, etc.) when utility power is unavailable or off grid. In some embodiments, the system includes an auto-transfer switch that senses and switches to an alternate electrical power source (i.e., backup power source) when utility electrical power is interrupted. In some embodiments, the system automatically switches back to utility power when it becomes available. In some embodiments, they system is installed at the customer's existing conventional electric panel. In some embodiments, the system is configured to sense and transfer one or more loads in a customer's home load to the backup power source when the utility power is off grid and vice versa.

In some embodiments, the system provides electricity customers with the most economical option to use their back up power source. In some embodiments, the system's transfer switch functionality increases the flexibility of micro-gridding. In some embodiments, the system provides customers with the option to manually switch between one or more backup power sources and a utility power source.

In some embodiments, the system includes a meter configured to couple to one or more backup power sources. In some embodiments, the system enables one or more backup power sources to be directly connected to the meter. In some embodiments, a separate electrical panel is not required between the any of the one or more backup power sources and the meter. In some embodiments, circuitry within the meter housing is configured to enable one or more of: multiple parallel generation, phase monitoring, WiFi connectivity, transfer switch selection and control, a user interface (UI, GUI), communication connections, one or more (universal) amperage adaptor plugs, and Next Generation Meter (NGM) core integration.

In some embodiments, multiple generator circuitry is configured to enable the system to draw power from the one or more backup power sources simultaneously. In some embodiments, phase monitoring circuitry is configured to provide protection for electrical devices by monitoring and/or providing notification if any phase is reversed, missing, or out of balance. In some embodiments, WiFi connectivity is configured to enable wireless communications to control and/or receive alerts from the system. In some embodiments, a transfer switch selection and control module enables a user to: select which of the one or more backup power sources are enabled automatically, to choose a sequence for bringing backup power sources online, and/or run the backup power sources in parallel. In some embodiments, a user interface enables a user to visually and/or audibly receive information from the meter and/or control one or more meter functions. In some embodiments, communication connections enable data transmission to one or more wired and/or wireless communication devices. In some embodiments, one or more universal amperage adaptor plugs enables a backup power source supply to be converted to the correct amperage for a particular load.

In some embodiments, the system includes a next generation meter ("NGM") core. In some embodiments, an NGM core comprises a compact modular electrical component that includes faster microprocessors, expanded memory, and multiple communications pathways within a hardware package less than 8" by 6". In some embodiments, the NGM core is approximately the size of a conventional credit card. In some embodiments, the NGM core enables modular maintenance within the meter by enabling replacement of critical electronic components without replacing the entire meter. In some embodiments, the NGM is configured to provide submetering for the one or more backup power sources in addition to the electrical utility.

In some embodiments, the NGM is configured to produce data in the form of both accurate billing data and grid data. In some embodiments, measured parameters for billing data include+/−real power component (Watts) and reactive power component (Vars). In some embodiments, the measured parameters for grid data are magnitude and phase angle of voltage and current, voltage and current harmonic distortion, and percent harmonic distortion. In some embodiments, the NGM is configured to log and/or report events such as sag/swell, undervoltage, and overvoltage conditions. In some embodiments, the NGM is configured to generate a phasor diagram of the meter installation and identified a phase using both single and three phase power sources. In some embodiments, NGM is configured to support 1-phase AC with a range of voltage from 85V to 305V. In some embodiments, the NGM is configured to support 3-phase AC with a range of voltage from 85 to 305V. In some embodiments, the NGM is configured to support multiple phase-neutral/phase-phase combinations such as Phases A and C to neutral, Phases A, B and C to neutral, Phase A to Phase B, Phase A to Phase B to Phase C, etc.

In some embodiments, the system includes an electric meter assembly comprising a removable or portable meter and/or a meter support platform or base. In some embodiments, the meter support platform or base is configured to removably electrically couple to at least one transformer. In some embodiments, the removable or portable meter is configured to removably electrically couple to the meter support platform or base. In some embodiments, the meter support platform or base is configured to receive inputs comprising at least one of an AC power supply, a phase voltage, and a phase current from the at least one transformer.

In some embodiments, the meter support platform or base is configured to provide outputs of at least one of DC power, AC phase voltage signals, and AC phase current signals to the removable or portable meter based at least in part on at least one of the inputs. In some embodiments, the removable or portable meter comprises a data manager configured for electric service analysis and transmission of electrical data including at least one of energy usage, internal temperature, voltage, current, phase angle, electric energy kWh and kVARh values, wrong installation detection, physical location of the removable or portable meter, and tamper detection.

In some embodiments, the removable or portable meter comprises an electric meter data management process stored on a non-transitory computer-readable storage medium that when executed by a processor is configured to provide web-enabled applications providing customer access to metering services including billing, energy usage, and statistics comprising current and past energy usage. In some embodiments, the removable or portable meter comprises a customer mobile application configured to enable the customer access on a mobile laptop computer and/or mobile phone or smart phone to monitor or view at least one parameter of an energy use by an electrical utility and/or one or more backup power source.

In some embodiments, the system includes a backup power transfer meter comprising: a housing, a circuit control board, a utility power connection, and one or more backup power connections. In some embodiments, the circuit control board is configured to be mounted in the housing. In some embodiments, the circuit control board comprises one or more utility contacts configured to isolate the utility power connection from an electrical load. In some embodiments, the circuit control board comprises one or more backup power contacts configured to isolate the one or more backup power connections from the electrical load. In some embodiments, the circuit control board comprises one or more sensors configured to detect a presence of utility power at the utility power connection and/or backup power at the one or more backup power connections.

In some embodiments, the backup power transfer meter further comprises multiple generator circuitry. In some embodiments, the multiple generator circuitry is configured to enable the circuit control board to draw power from two or more of the one or more backup power connections simultaneously. In some embodiments, the backup power transfer meter further comprises a transfer switch selection and control module. In some embodiments, the transfer switch selection and control module is configured to enable a user to select which of the one or more backup power connections to supply power to the circuit control board automatically. In some embodiments, the transfer switch selection and control module is configured to enable the user to choose a sequence for delivering electrical power from the utility power connection and/or the one or more backup power connections to the backup power transfer meter. In some embodiments, the transfer switch selection and control module is configured to enable the user to complete an electrical connection between two or more of the one or more backup power connections in parallel.

In some embodiments, the backup power transfer meter of claim 3, further comprises one or more universal amperage adaptor plugs. In some embodiments, the one or more universal amperage adaptor plugs are configured to enable the utility power and/or backup power to be converted to a correct amperage for the electrical load. In some embodiments, the backup power transfer meter further comprises a push button panel. In some embodiments, the push button panel is located on a side of the housing. In some embodiments, the push button panel comprises one or more indicator lights configured to indicate an electrical state of the backup power transfer meter. In some embodiments, the one or more indicator lights indicate: when the one or more backup power connections are in use; when the utility power connection is in use; and/or when the utility power is available. In some embodiments, the backup power transfer meter further comprises a thermo sensor. In some embodiments, the thermo sensor is configured to detect an abnormal temperature condition within the housing. In some embodiments, the utility power comprises electricity from an electrical grid configured to supply the electricity to multiple electrical meters.

In some embodiments, the backup power transfer meter comprises: a housing, a control circuit, a utility provided power connection, and one or more backup power connections. In some embodiments, the control circuit is configured to be mounted in the housing. In some embodiments, the control circuit comprises one or more sensors configured to detect a presence of utility provided electricity at the utility provided power connection and backup power electricity at the one or more backup power connections. In some embodiments, the control circuit is configured to deliver the backup power electricity to the one or more sensors when both the utility provided power connection and the one or more backup power connections are both isolated from an electrical load by the control circuit. In some embodiments, the one or more sensors are configured to continue to receive electrical power from the one or more backup power connections upon loss of the utility provided electricity.

In some embodiments, the backup power transfer meter, further comprises multiple generator circuitry. In some embodiments, the multiple generator circuitry is configured to enable the control circuit to supply electricity from two or more of the one or more backup power connections to an electrical load simultaneously. In some embodiments, the backup power transfer meter further comprises a transfer switch selection and control module. In some embodiments, the transfer switch selection and control module is configured to enable a user to select which of the utility provided power connection and/or the one or more backup power connections provides electricity to an electrical load. In some embodiments, the transfer switch selection and control module is configured to enable the user to choose a sequence for selecting which of the utility provided power connection and/or the one or more backup power connections supplies electricity to the electrical load. In some embodiments, the transfer switch selection and control module is configured to enable a user to select a delivery of electricity from the one or more backup power connections in parallel. In some embodiments, the backup power electricity is supplied from one or more of photovoltaic electrical source, a battery electrical source, and/or a fossil fuel electrical power source. In some embodiments, The backup power transfer meter further comprises a thermo sensor. In some embodiments, the thermo sensor is configured to detect an abnormal temperature condition within the housing. In some embodiments, an abnormal temperature condition includes arcing.

DRAWING DESCRIPTION

FIGS. 3-11 show zoomed portions of components illustrated in FIG. 2 as well as additional enabling details according to some embodiments.

FIG. 17 depicts a simplified wiring diagram where the system provides automatic switching between 4 power sources according to some embodiments.

FIG. 19 illustrates a computer system enabling or comprising the systems and methods in accordance with some embodiments of the system.

Figure 23:
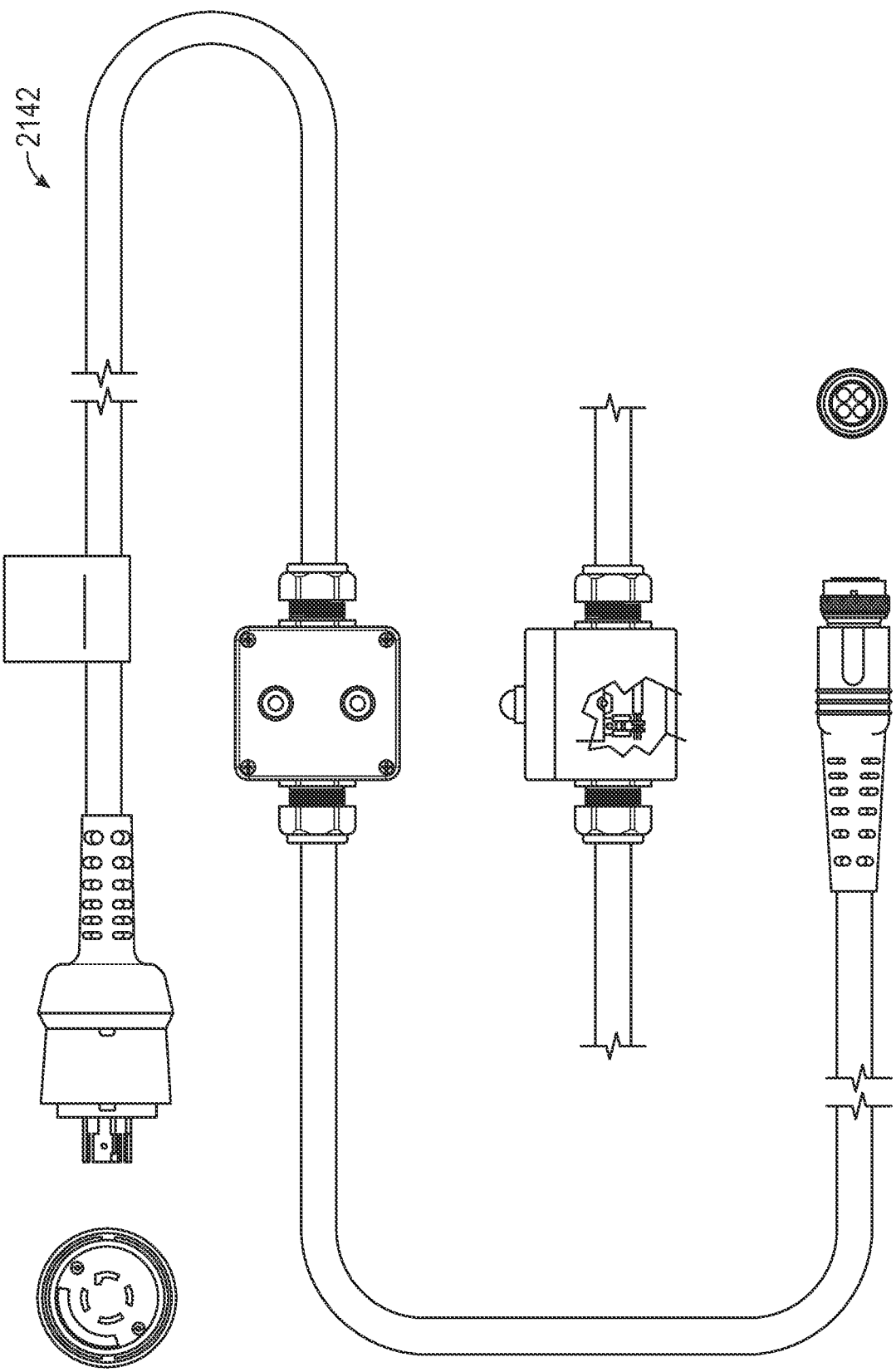

FIG. 23 a second non-limiting example of an overcurrent protection cable according to some embodiments.

DETAILED DESCRIPTION

The following section is provided to enable those of ordinary skill to make and use some embodiments of the system. The arrangement of physical components is not all-inclusive, and those of ordinary skill will understand that numerous configurations for the system can be derived from the present disclosure.

Figure 1:
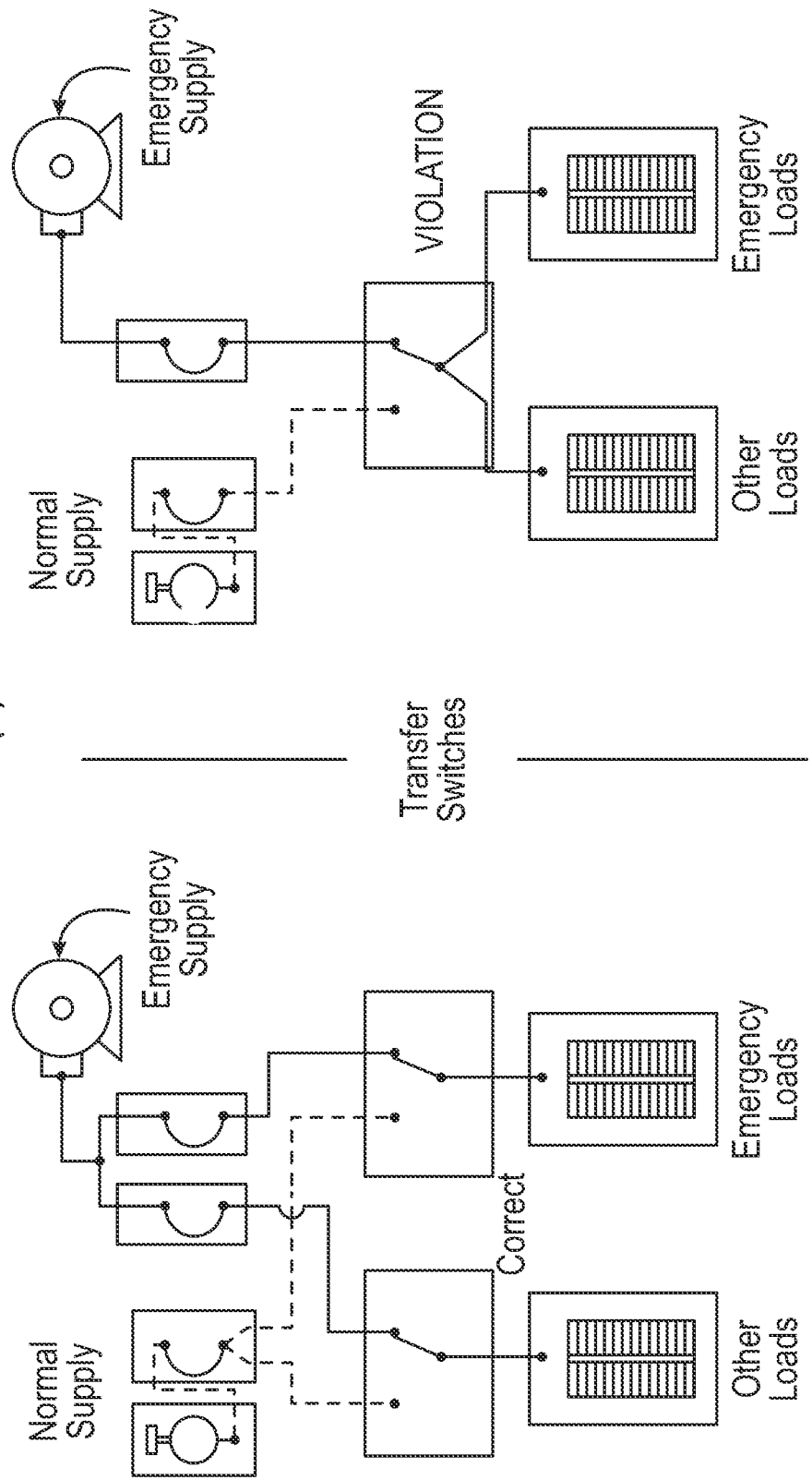
FIG. 1 is an illustration of the NEC requirement for transfer switch connections according to some embodiments.
Figure 2:
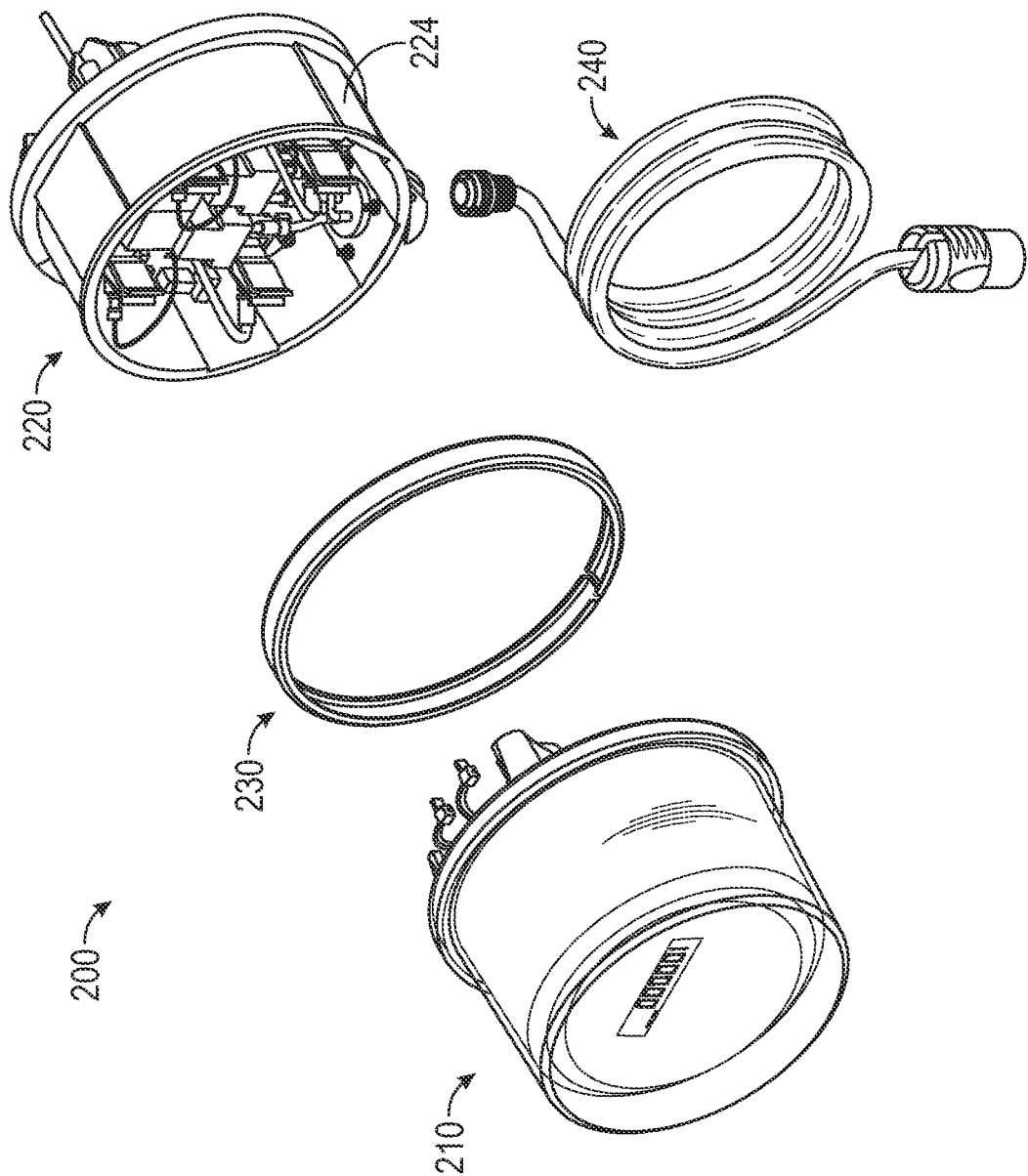
FIG. 2 shows various components of the system according to some embodiments.

FIG. 2 depicts various components the Backup Power Transfer Meter (BPTM) system according to some embodiments. FIGS. 3-7 are zoomed views of each component shown in FIG. 2. In some embodiments, the BPTM 200 includes two main assemblies: the meter 210 and the smart socket adaptor 220 (also referred to as a BPTM disconnect base or housing). In some embodiments, the meter 210 includes one or more of a network card and internal disconnect switch. In some embodiments, the meter 210 is configured such that the electrical connection between the meter's Printed Circuit Board (PCB; also referred to herein as a control circuit and/or circuit board) and a disconnect relay motor is separated. In some embodiments, the meter 210 includes a Focus AXR-SD 2S electric meter with a Silver Spring Network card and internal disconnect switch, for example. In some embodiments, connections for the meter's PCB and disconnect relay motor are configured to be individually wired back to the smart socket adaptor 220.

Figure 4:
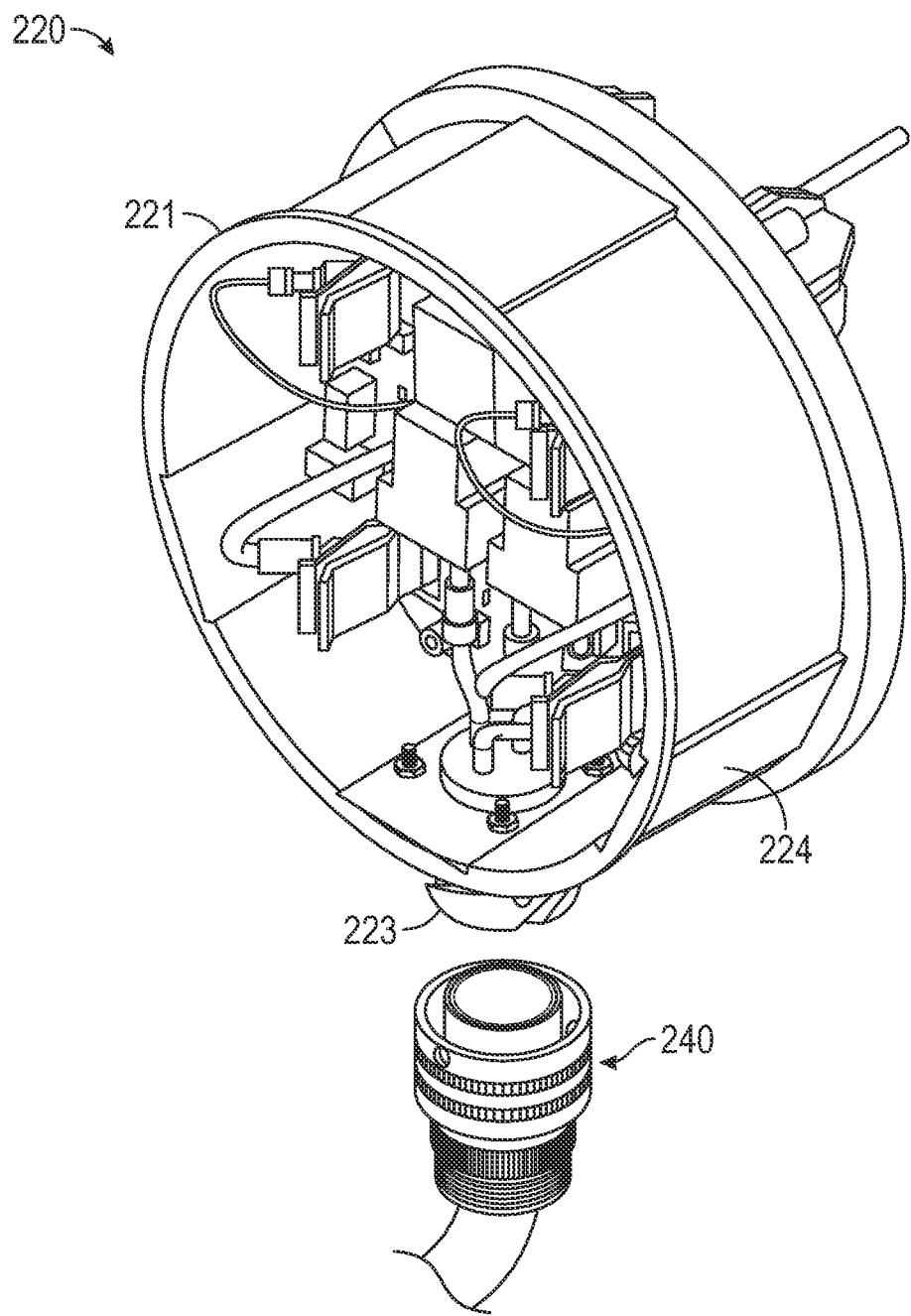
Figure 5:
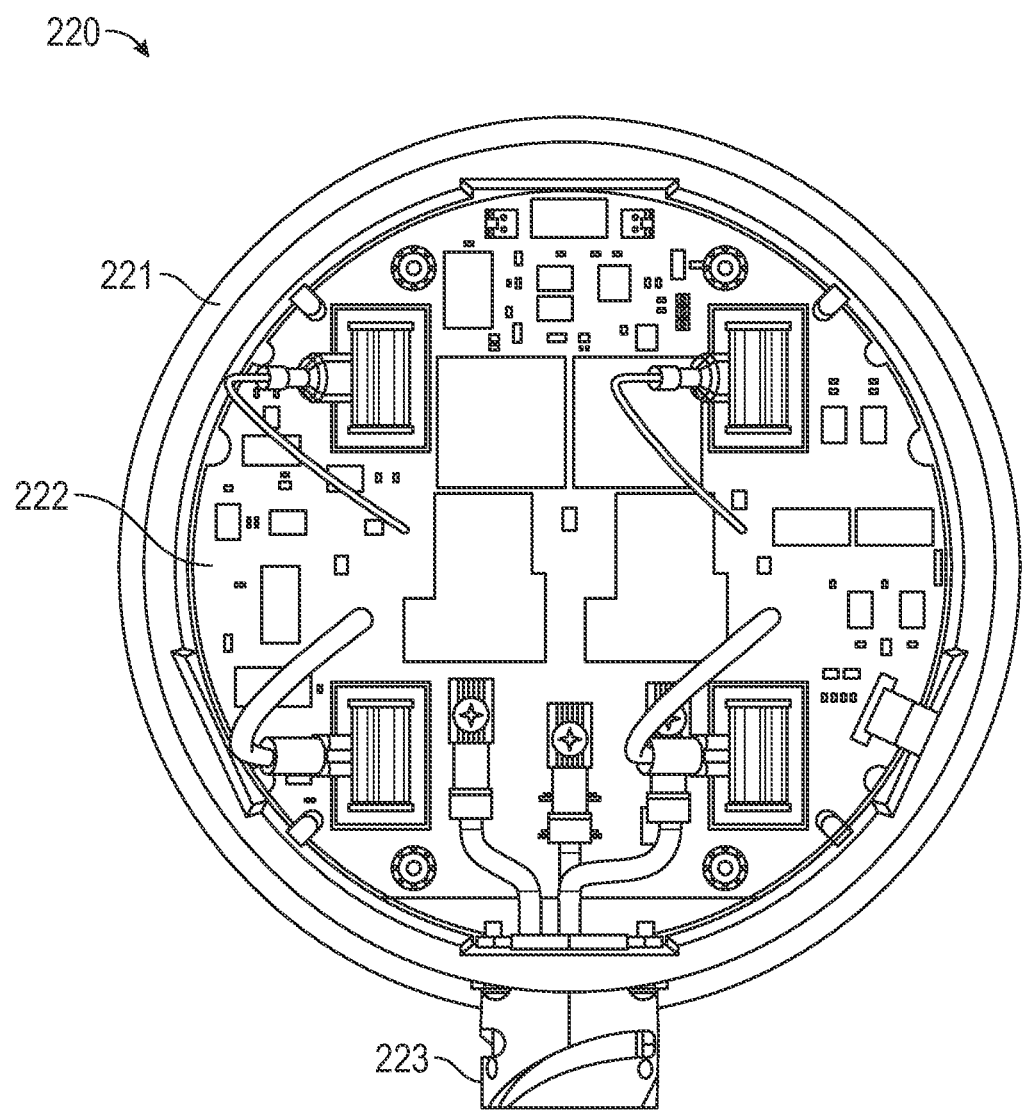
Figure 12:
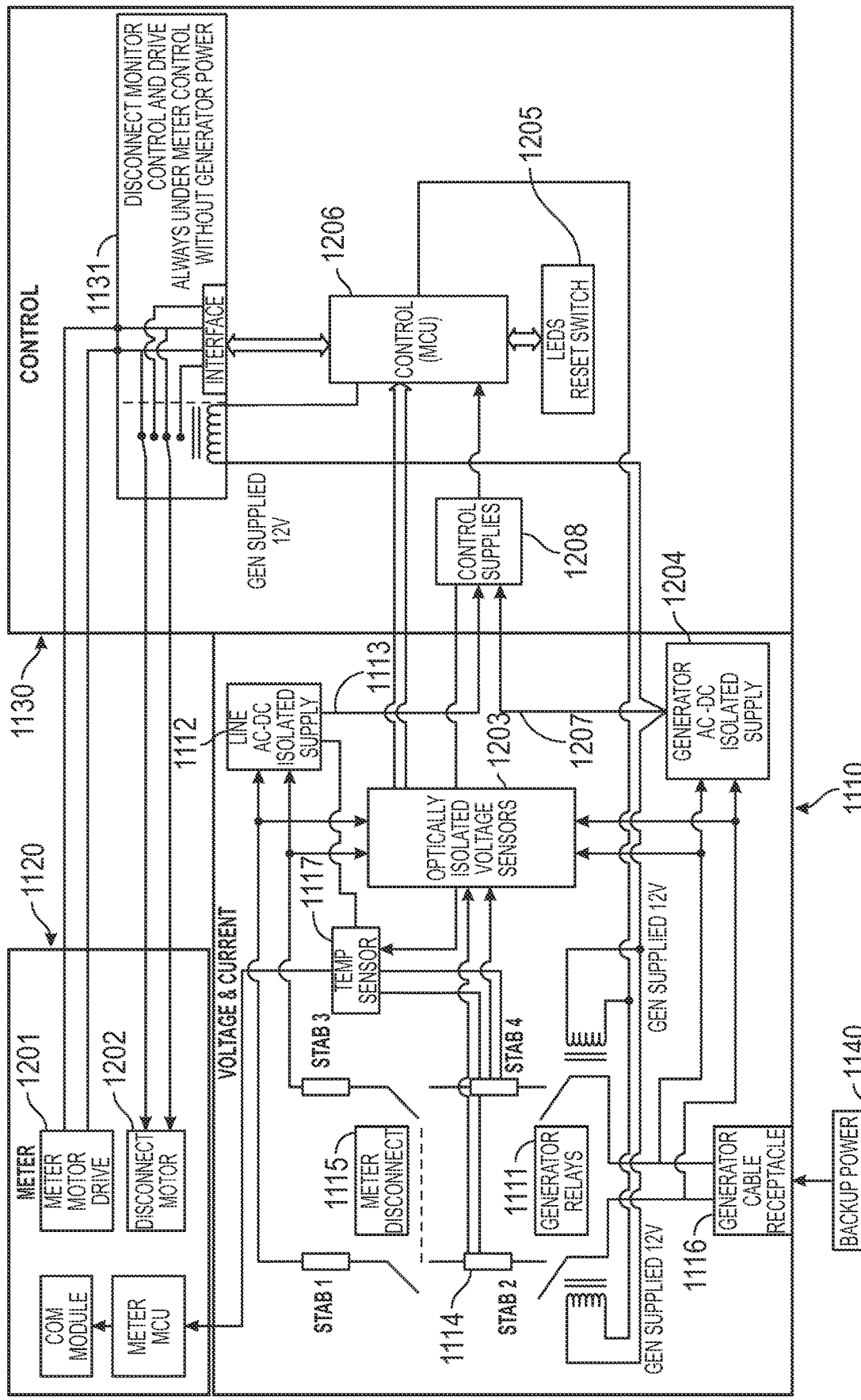
FIG. 12 depicts a control circuit wiring diagram according to some embodiments.

Referring to FIGS. 4 and 5, in some embodiments, the smart socket adaptor 220 includes one or more of three components: the housing 221, a PCB 222 mounted in the housing 221, a generator connector 223, and/or a pushbutton panel 224. In some embodiments, the PCB 222 is configured to control a disconnect switch motor in the meter 210. In some embodiments, the system uses the meter 210's disconnect relay contacts to isolate utility power from an electrical load (e.g., one or more electrical devices coupled to a panel located in a house). As best shown in FIG. 12, in some embodiments, high current backup relays 1111 isolate the backup power source 1140 (e.g., generator) from the electrical load. In some embodiments, the PCB 222 includes one or more sensors (e.g., voltage sensors) configured to detect the presence of utility and backup power source throughout the module.

In some embodiments, the BPTM 200 provides a safe, easy to use way for a user to connect one or more backup power sources to electrical loads. For example, in some embodiments, the BPTM is configured to couple to one or more VAC, 30-60 Amp generators.

In some embodiments, the system includes one or more backup power connectors extending from the system housing configured to couple to one or more backup power sources. In some embodiments, one or more backup power sources are coupled using one or more interconnect cables 240 (see FIGS. 2 and 4). In some embodiments, the cable has connectors on both ends: a 3-pole high current connector on one side and a conventional connector (e.g., L14-30P) on the other side.

Figure 3:
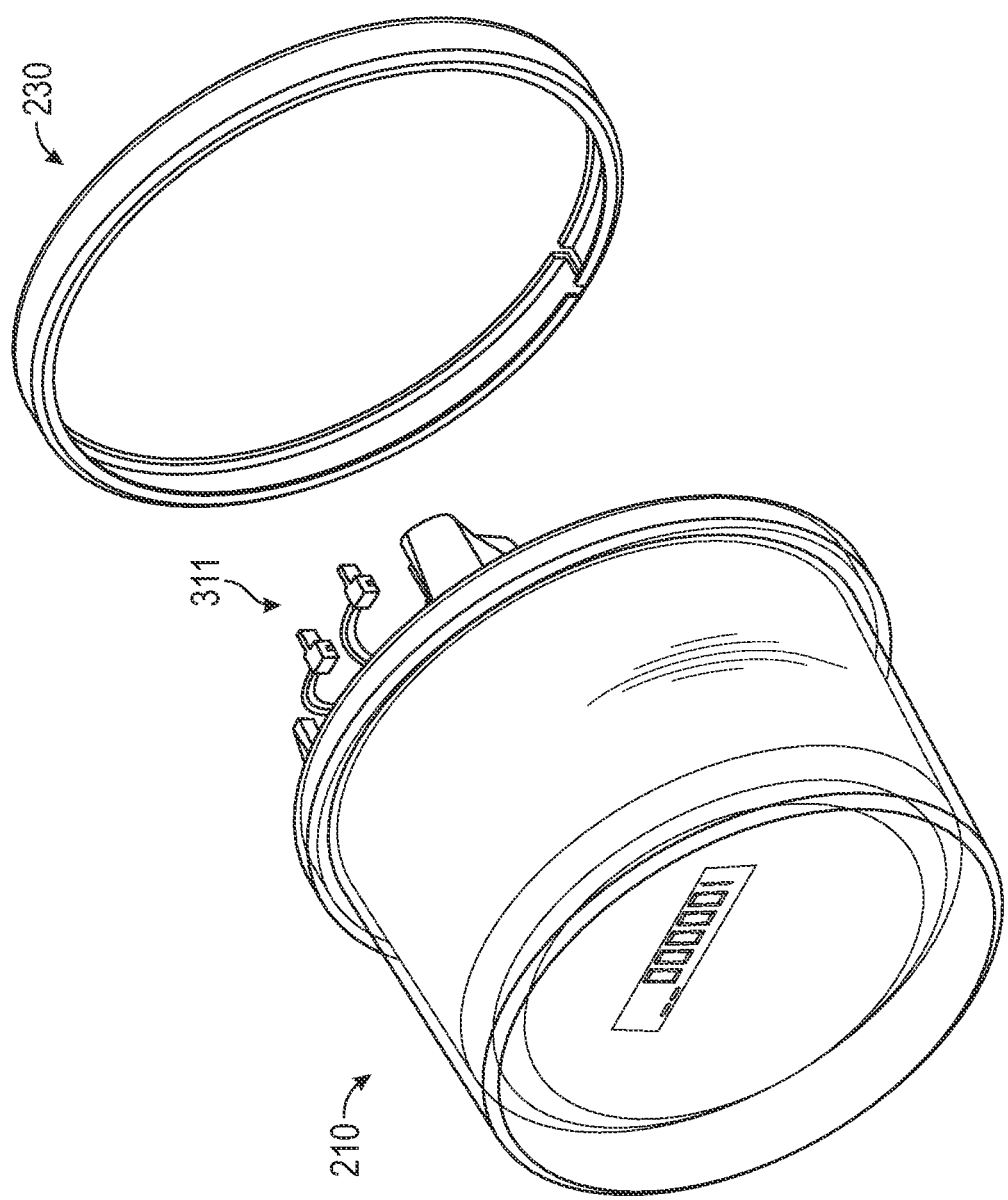

In some embodiments, to couple the meter 210 to the socket adaptor 220, a user first identifies the two wire pairs 311 extending from the back of the meter 210 (see FIG. 3). In some embodiments, the RED/BLK connector 315 (FIG. 3) is configured to be plugged into J101 connector 515 on the PCB (FIG. 5). In some embodiments, the RED/WHT connector 316 (FIG. 3) is configured to be plugged into J102 connector 516 (FIG. 5) connector on the PCB 222. In some embodiments, the meter 210 is pushed into the adaptor 220 such that the meter stabs and the adaptor blades on the two wire pairs 311 are fully engaged. In some embodiments, the meter ring 230 (see FIG. 3) is then installed to secure the connection between the two components.

Figure 6:
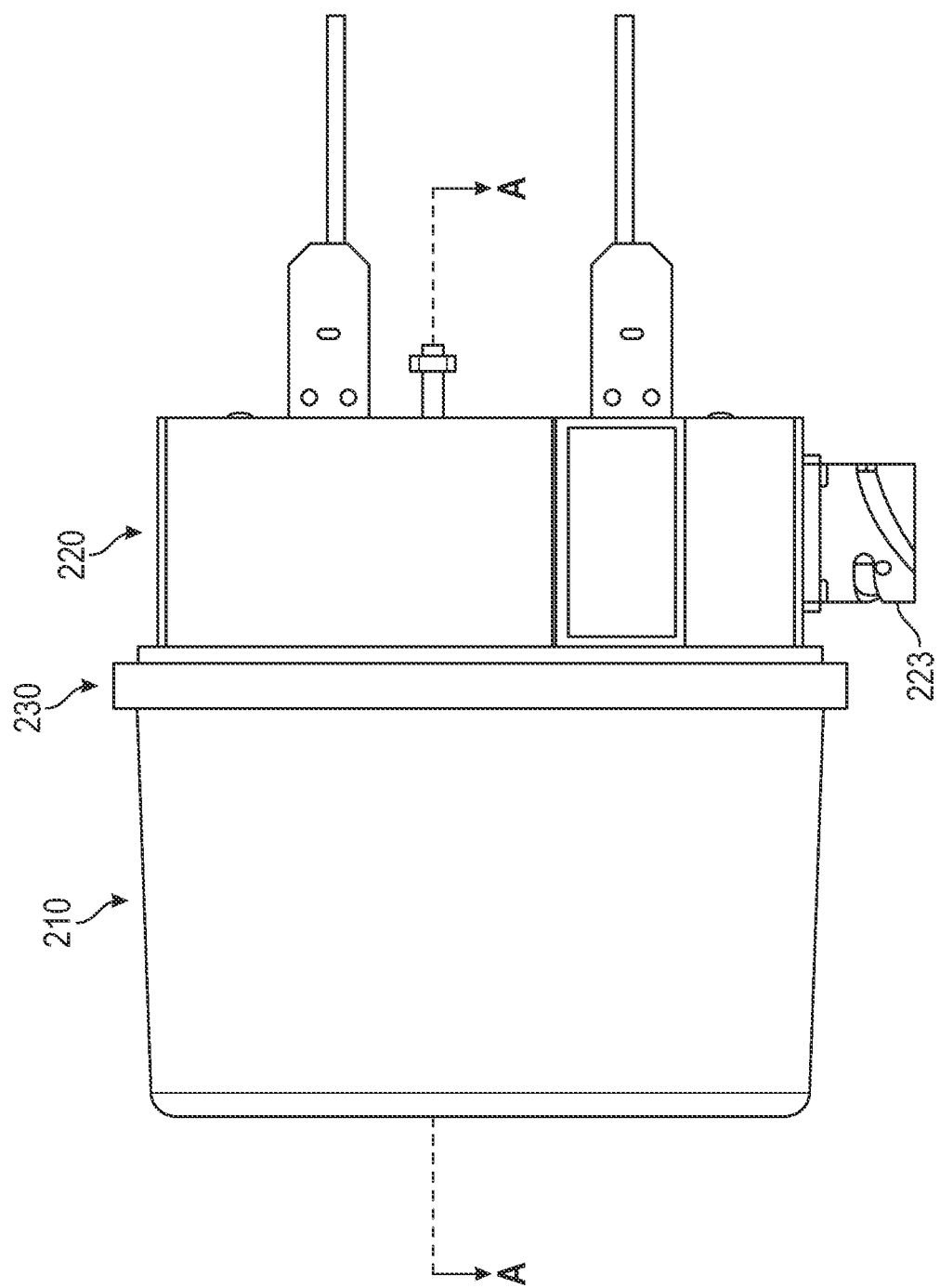
Figure 7:
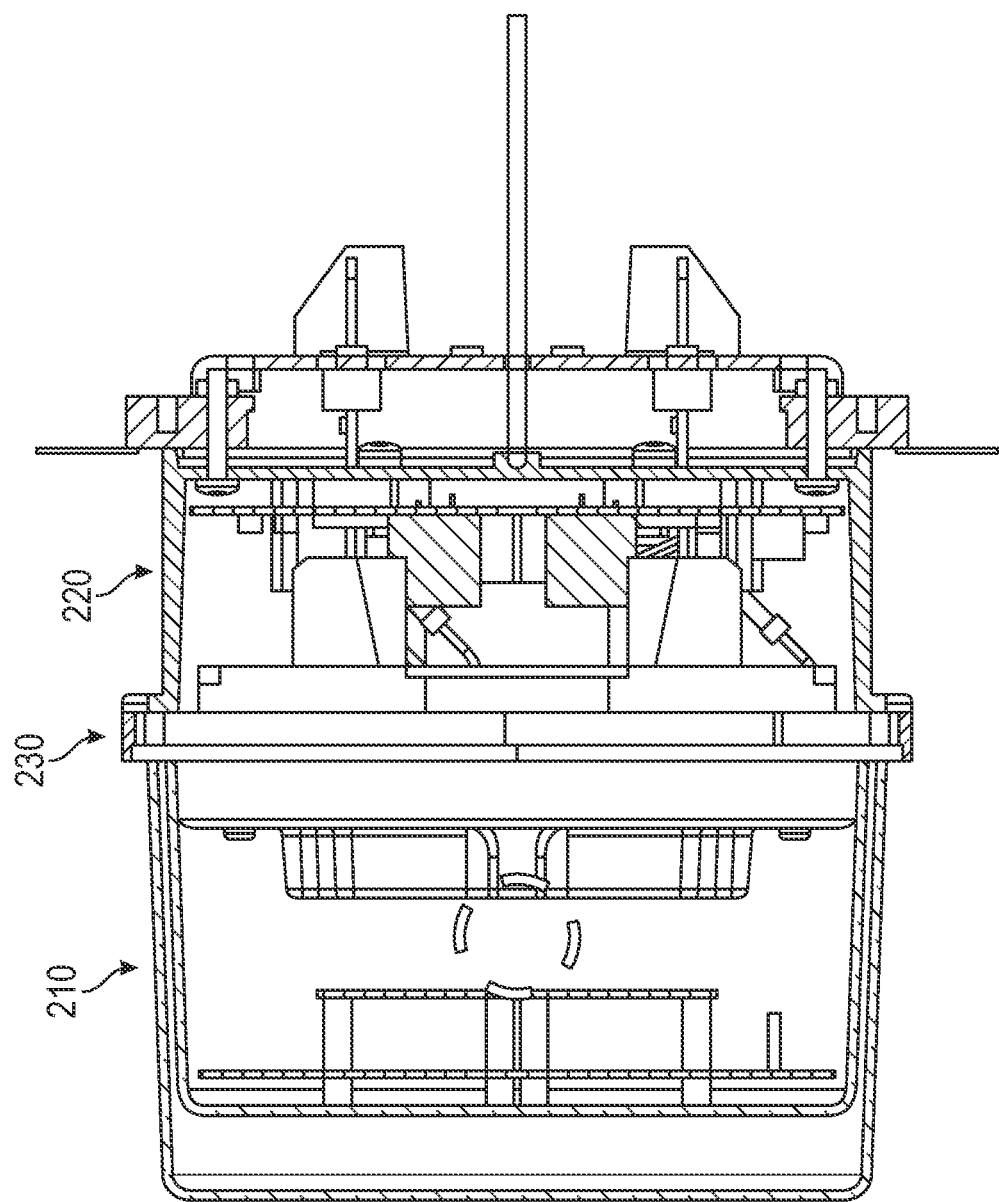
Figure 8:
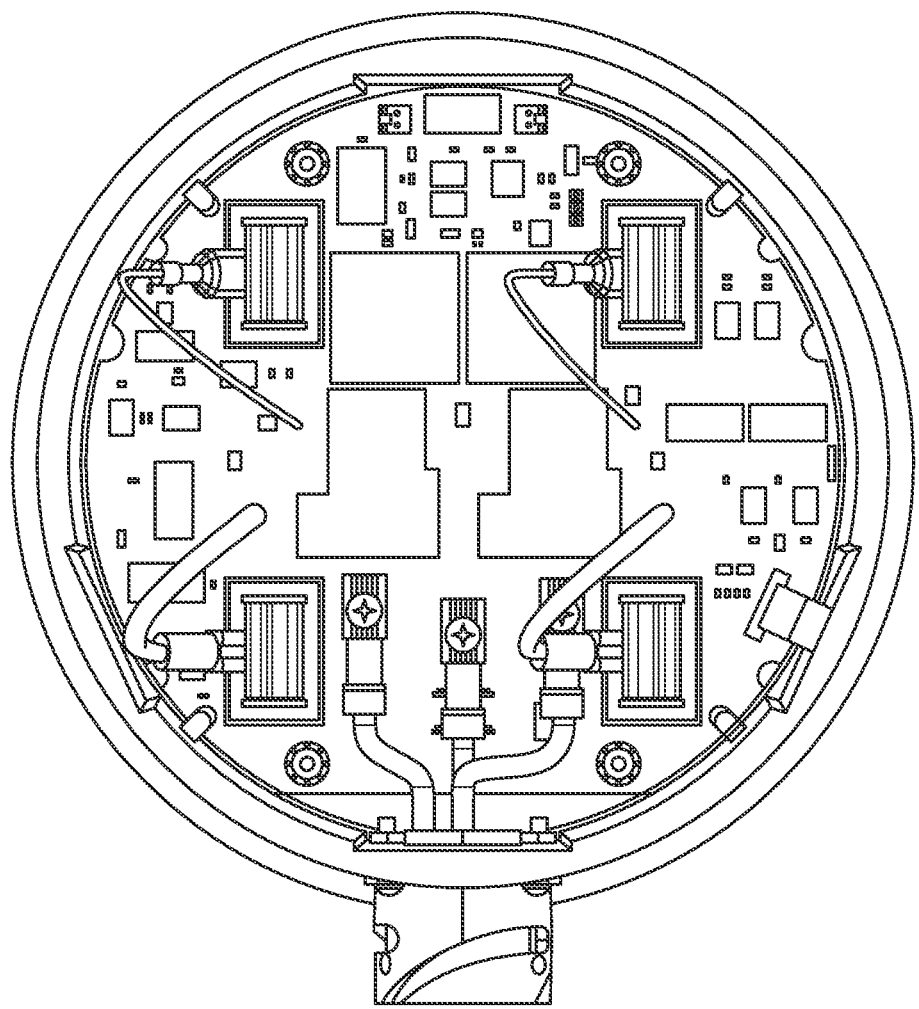

FIG. 6 shows a side assembled view of the BPTM according to some embodiments. FIG. 7 is a sectional view of FIG. 6 along cut A-A showing various internal features and non-limiting dimensions according to some embodiments. FIGS. 8 and 9 depict various labeled components corresponding the parts table show in FIG. 10 to aid those of ordinary skill and making and using a non-limiting embodiment of the system.

Figure 11:
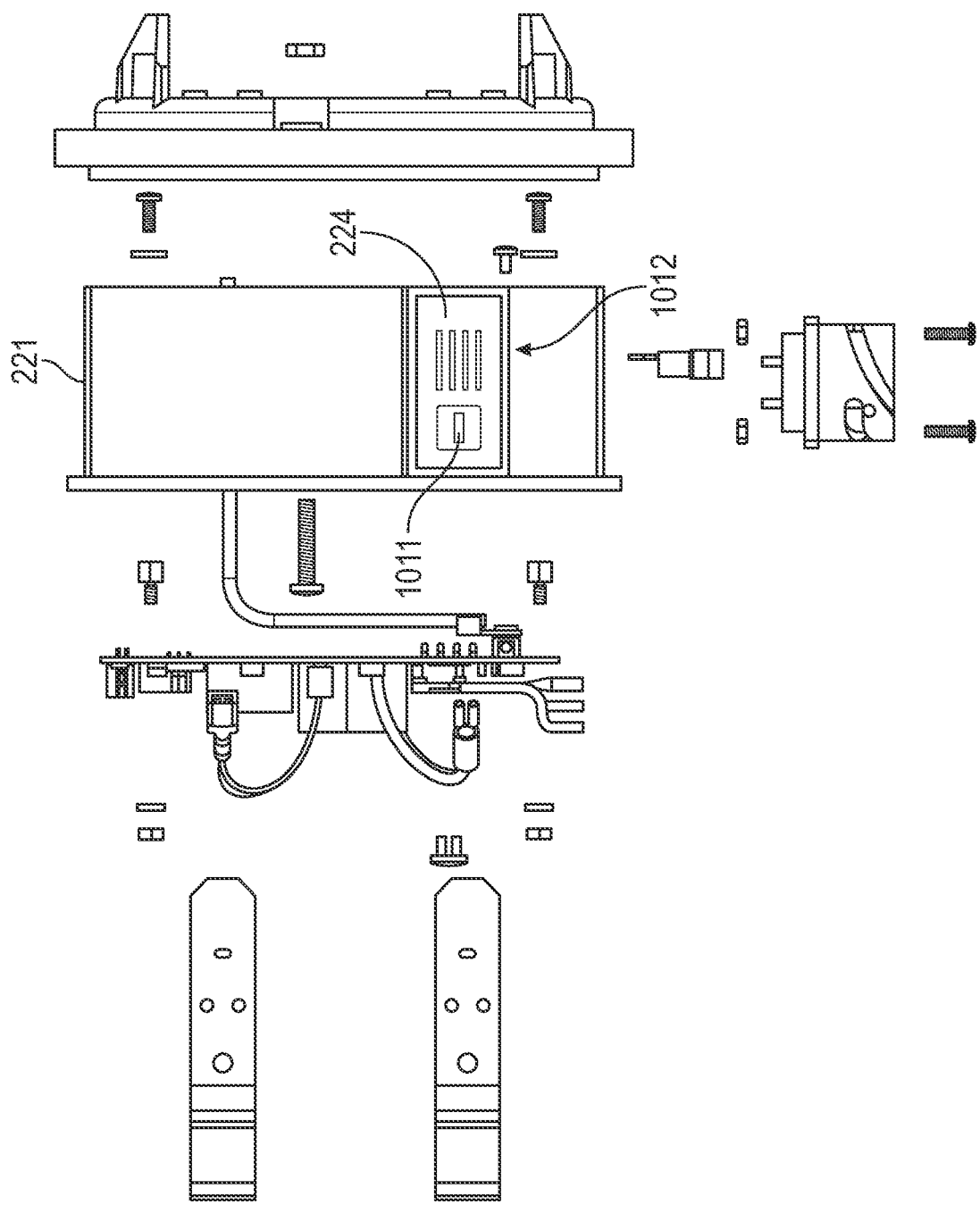

FIG. 11 shows an exploded view 1000 of the socket adaptor 220 according to some embodiments. In some embodiments, a push button panel 224 located on the side of the housing 221 includes, for example, a dome-type sealed pushbutton 1011 that is used to reset the state of the system when it faults. In some embodiments, the pushbutton panel 224 also includes three status LEDs 1012 on one or more sides of the housing 221 that indicate when 1) generator power is in use (amber), 2) utility power is in use (green), and 3) utility power is on (blue).

In some embodiments, a description of how the system operates in different states is described as follows:
  State: No Utility Power or Generator Power Present
    Meter disconnect control is given to the meter.
    Generator relays are open.
    System is unpowered.
  State: No Utility Power, but Generator Power Is Present
    The system checks the following:
      1. Voltage present at each line stab
      2. State of the disconnect switch.
      3. Voltage present at each generator terminal
      4. State of generator relay contacts.

After a predetermined delay (e.g., 10 seconds), if the system is ready to switch over to generator power, the meter disconnect control is switched to the system.

The meter disconnect switch is opened.

If there is no voltage on the load side of the meter, the generator relay is closed to deliver generator power to the house.

Initiate indicator lights to confirm that the generator voltage is present at the load side of the meter.

State: Utility Power Is Present

The system checks the following:
1. Voltage present at each line stab
2. State of the disconnect switch.
3. Voltage present at each generator terminal
4. State of generator relay contacts.

After a predetermined delay (e.g., 10 seconds), if the system is ready to switch over to utility power, the generator relays are opened.

If there is no voltage on the load side of the meter, the meter disconnect relay is closed.

The meter disconnect control is switched back to the meter.

Initiate indicator lights to confirm that the utility voltage is present at the load side of the meter.

In some embodiments, the indicator lights indicate fault conditions. In some embodiments, example indicator light configurations for faults are as follows:

In some embodiments, a "meter disconnect will not open" fault caused by a meter disconnect relay results in amber and green LED lights flashing together.

In some embodiments, "a generator relay will not open" fault caused by generator relay failure or alternate house power source detection results in amber and blue LED lights flashing together.

In some embodiments, an "only one line voltage present for 100 ms" fault caused by utility distribution transformer failure results in amber and green LED lights flashing alternately.

In some embodiments, an "only one load voltage present for 100 ms" fault caused by meter disconnect relay or generator relay failure results in amber and blue LED lights flashing alternately.

In some embodiments, an "unexpected load voltage present" fault caused by and alternate power source wired to a load (e.g., house, panel) results in green and blue LED lights flashing together.

In some embodiments, if any fault condition exist, then no power will be supplied to electrical components connected to the system. In some embodiments, if any fault condition exists, the watchdog timer generates a system reset. In some embodiments, a watchdog timer includes a hardware time that automatically generates a processor reset if the system does not reset the timer before it counts down. In some embodiments, the watchdog timer is a conventional watchdog timer. In some embodiments, the system is configured to then check again after the reset to see if any fault condition still exists.

FIG. 12 depicts a BPTM 200 electrical wiring block diagram according to some embodiments. In some embodiments, the BPTM 200 includes one or more of a voltage and current module 1110, a meter module 1120, and a control module 1130. In some embodiments, the voltage and current module 1110 includes a utility power source (AC to DC) isolated supply module 1112 and a generator (AC to DC) isolated supply 1204. Any reference to a "generator" herein including the illustrations is a general reference to a backup power supply that includes any source of electrical energy according to some embodiments.

In some embodiments, the isolated supply module 1112 is powered by utility provided power and the generator isolated supply 1204 supplied by one or more connected backup power source 1140. In some embodiments, the isolated supply module 1204 output 1207 powers both the control module 1130 and generator relays 1111 when the backup power source 1140 is energized with electrical power. In some embodiments, without power supplied from a backup power source 1140, the generator stabs 1114 would never be connected in the event of a loss of utility power as the meter would be the only source of power for the meter disconnect utility power relays 1115. In some embodiments, the isolated supply module 1204 is configured to supply generator power to the control supplies 1208 via an electrical line 1207. In some embodiments, the control supplies 1208 is configured to receive electrical power from the backup power source such that it is not dependent on the generator relays 1111 or the utility power relays 1115 for electricity. In some embodiments, this arrangement ensures that the disconnect monitor, control, and drive unit 1131 located within the control module 1130 are always supplied electrical power when there is no utility power source 1140 supplying power through the utility power relays 1115.

Figure 20:
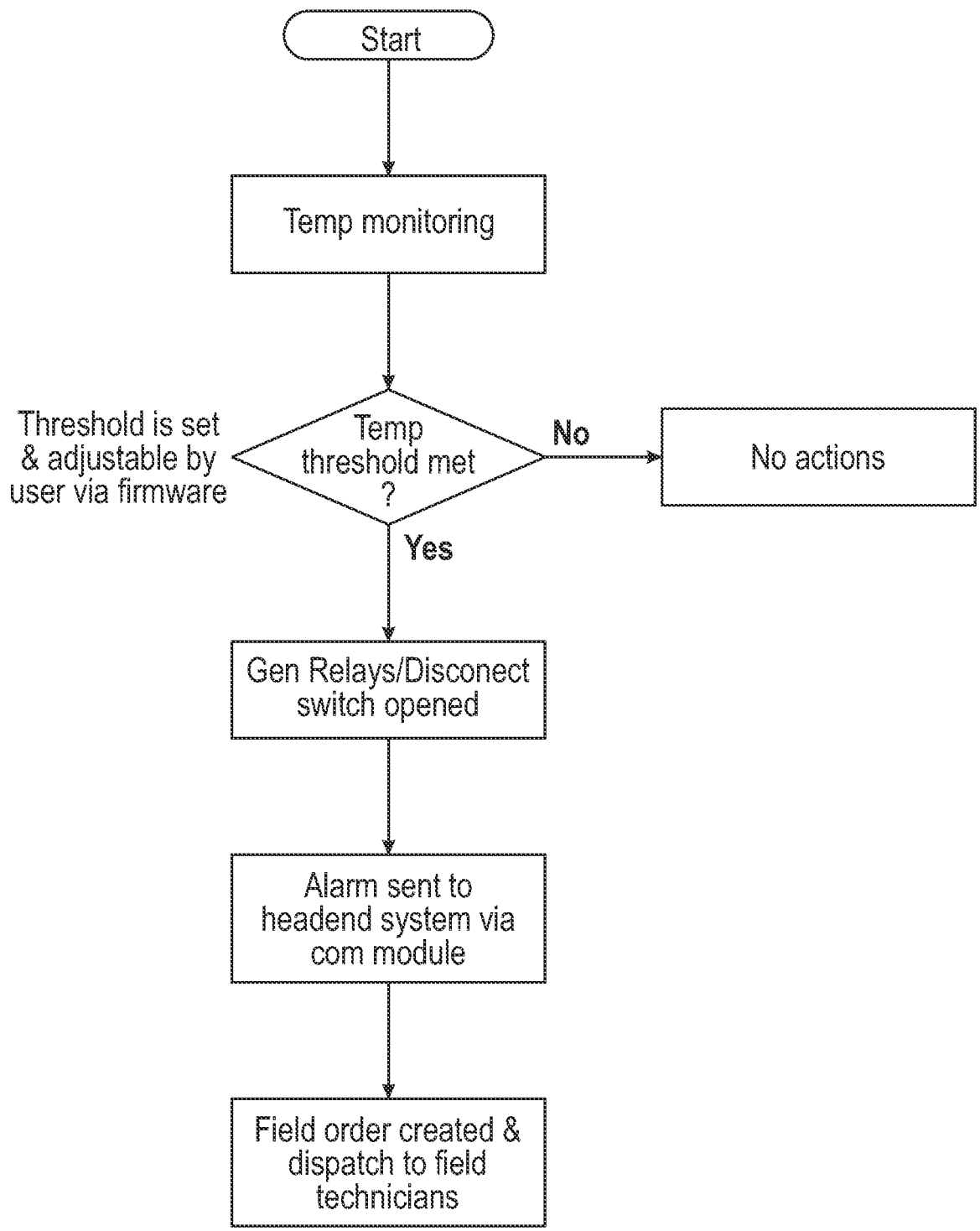
FIG. 20 illustrates a flowchart of the thermo sensor circuit according to some embodiments.

In some embodiments, the BPTM includes a thermo sensor 1117 as shown in FIG. 12. In some embodiments, the thermo sensor 1117 is a temperature sensor configured and arranged to detect an abnormal temperature condition. In some embodiments, an abnormal temperature condition includes a "hot socket" condition in which socket jaws at the meter panel have deteriorated or been comprised such that arcing is taking place, causing high temperature conditions and a potential safety hazard at the meter socket. When a "hot socket" condition is detected, the BPTM will generate an alarm and notify the customer and the utility via WIFI and/or AMI communication. FIG. 20 illustrates a flowchart of the thermo sensor 1116 circuit according to some embodiments.

In some embodiments, The BPTM has the ability to support up to 60 A. In order to achieve 60 A, the general purpose power relay is modified from 30 A to 60 A and the multi-conductor cable is modified from No. 10 AWG to at least No. 6 AWG.

Figure 13:
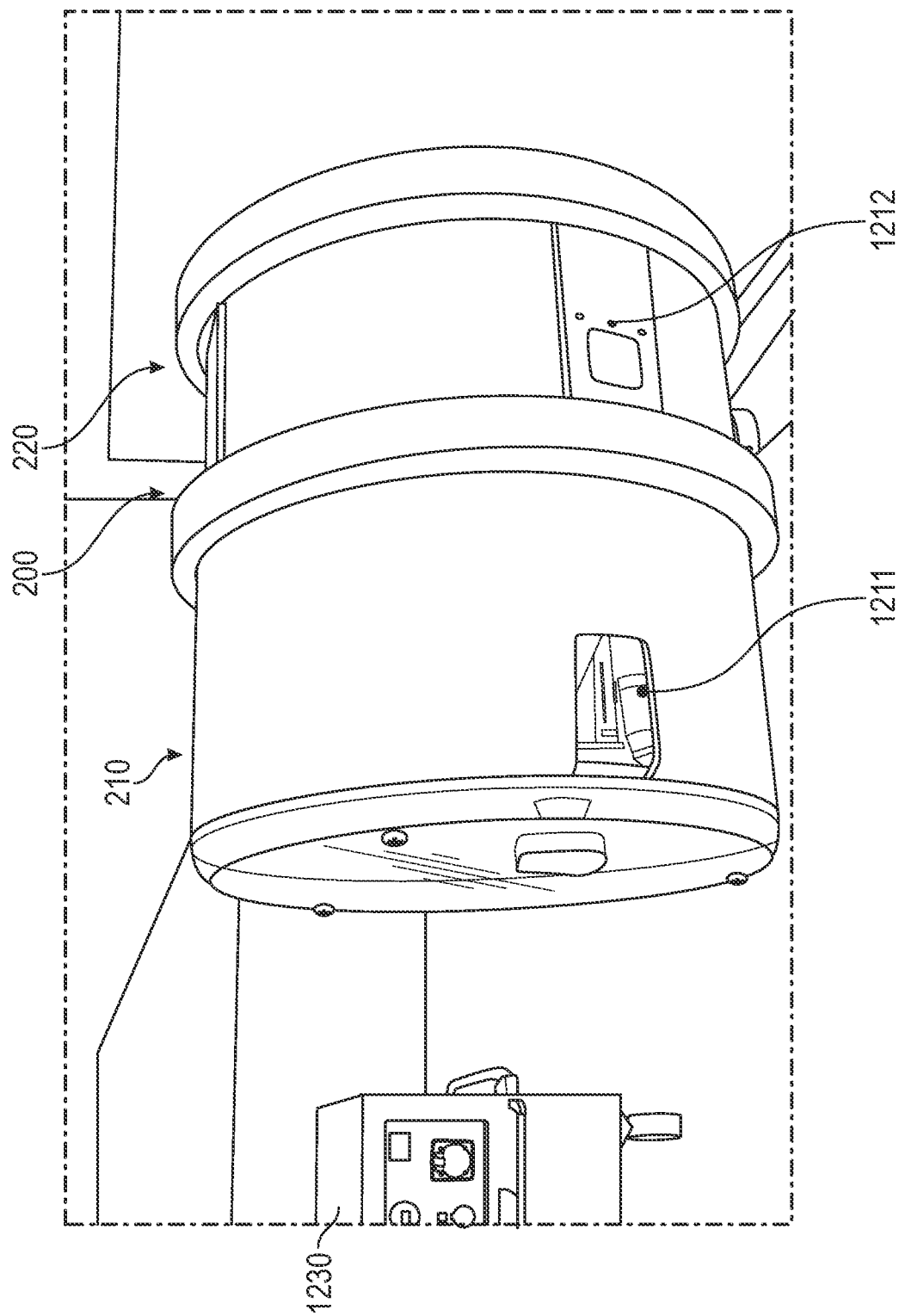
FIGS. 13-16 depict a user connecting the system to a backup power source (in this example a battery) according to some embodiments.
Figure 14:
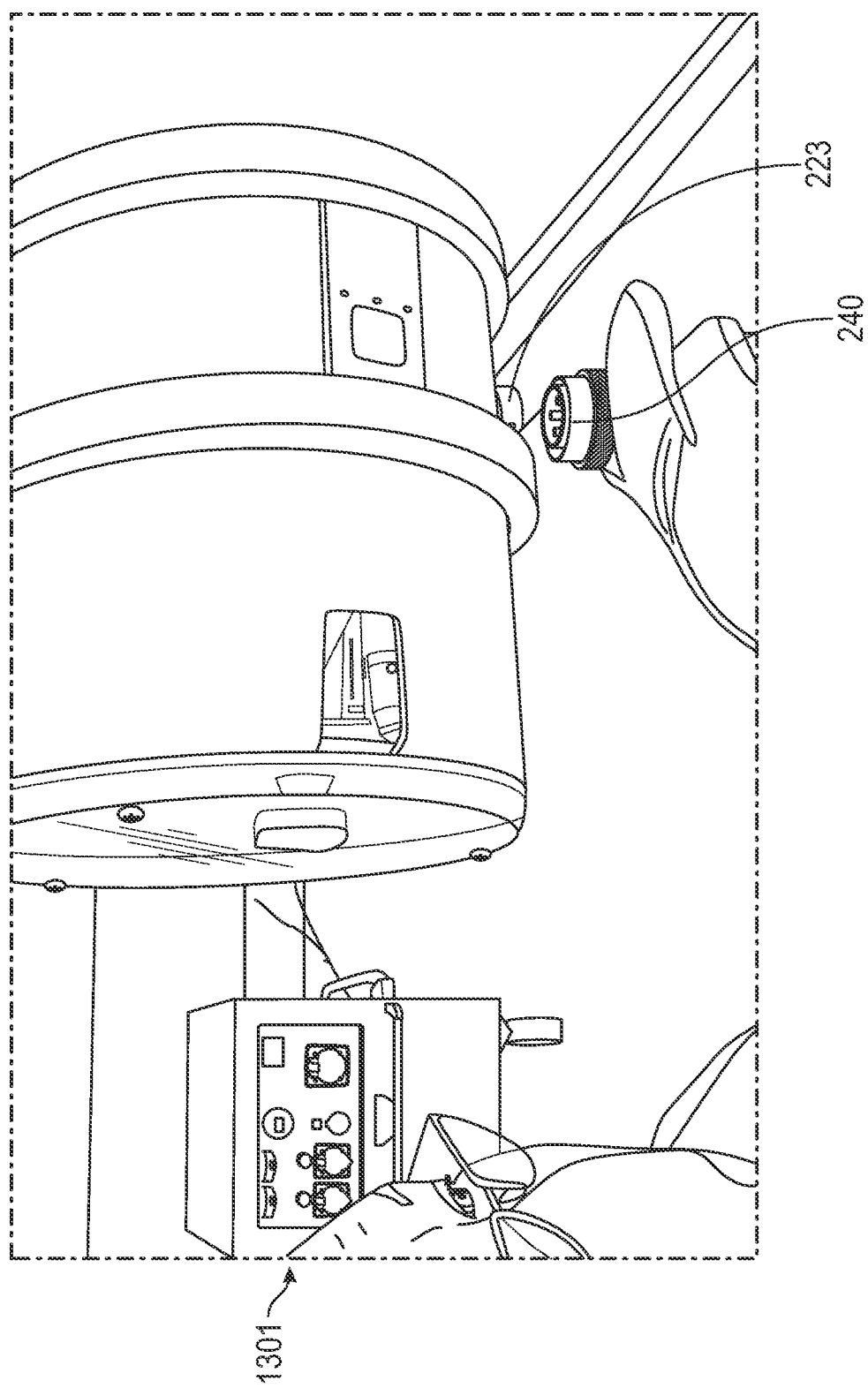
Figure 15:
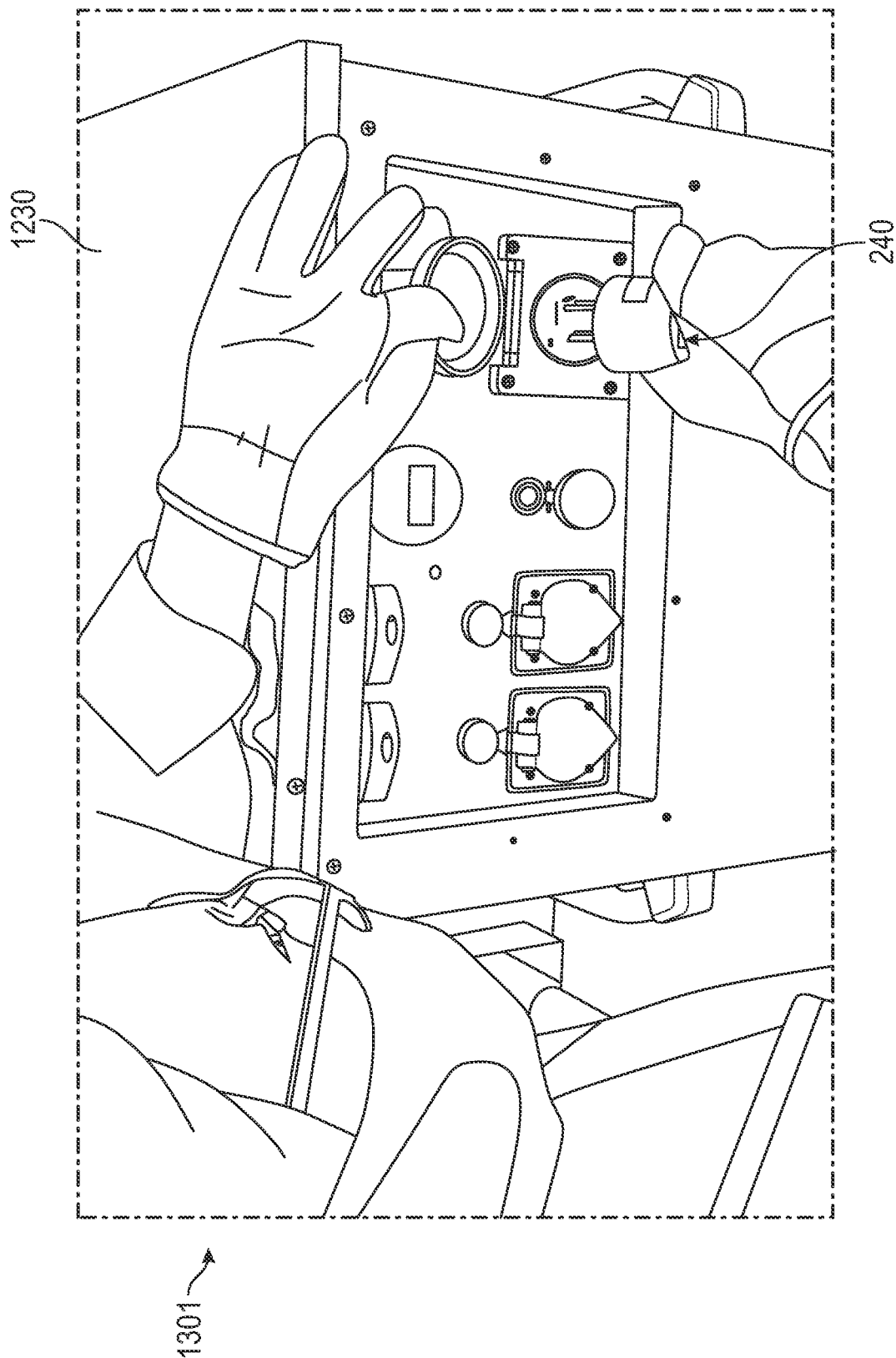
Figure 16:
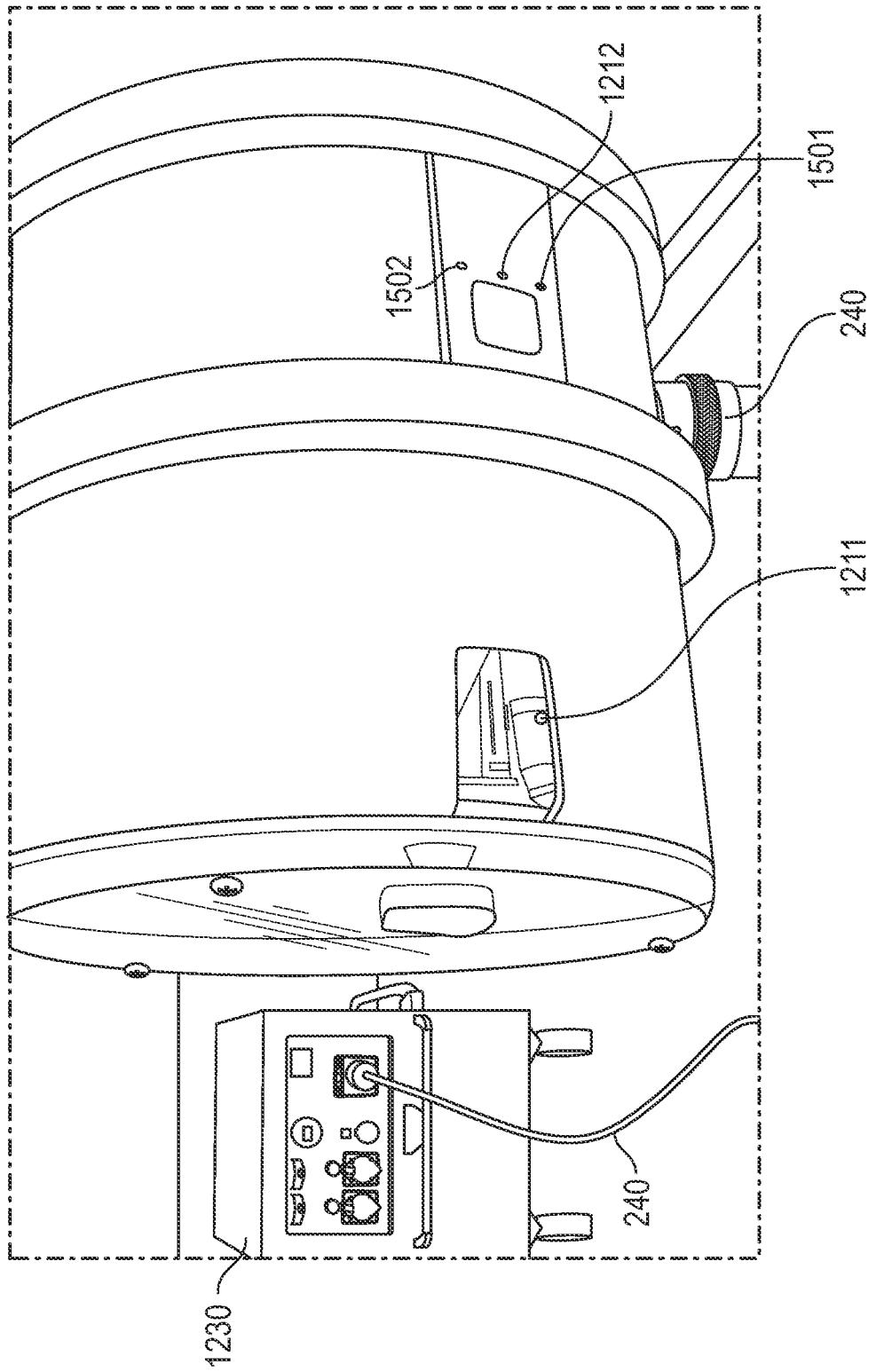

FIGS. 13-16 depict a user connecting the system to a backup power source 1230 (in this example a battery) according to some embodiments. As shown in FIG. 12, a blinking green indicator light 1211 on the meter 210 as well as a solid green indicator light 1212 on the socket adaptor 220 indicate the meter is running off utility power according to some embodiments. In FIG. 13, a user connects an interconnect cable 240 to the generator connector 223 according to some embodiments. FIG. 14 shows the user 1301 coupling the other end of the interconnect cable 240 to the backup power source 1230. In FIG. 15, the indicator lights 1211 and 1212 are not illuminated indicating a loss of electrical power, while indicator light 1501 shows the system is being supplied from the backup power source 1230. In some embodiments, the indicator light 1502 illuminates when utility power is restored. In some embodiments, the system is configured to automatically revert back to utility power when available.

Figure 18:
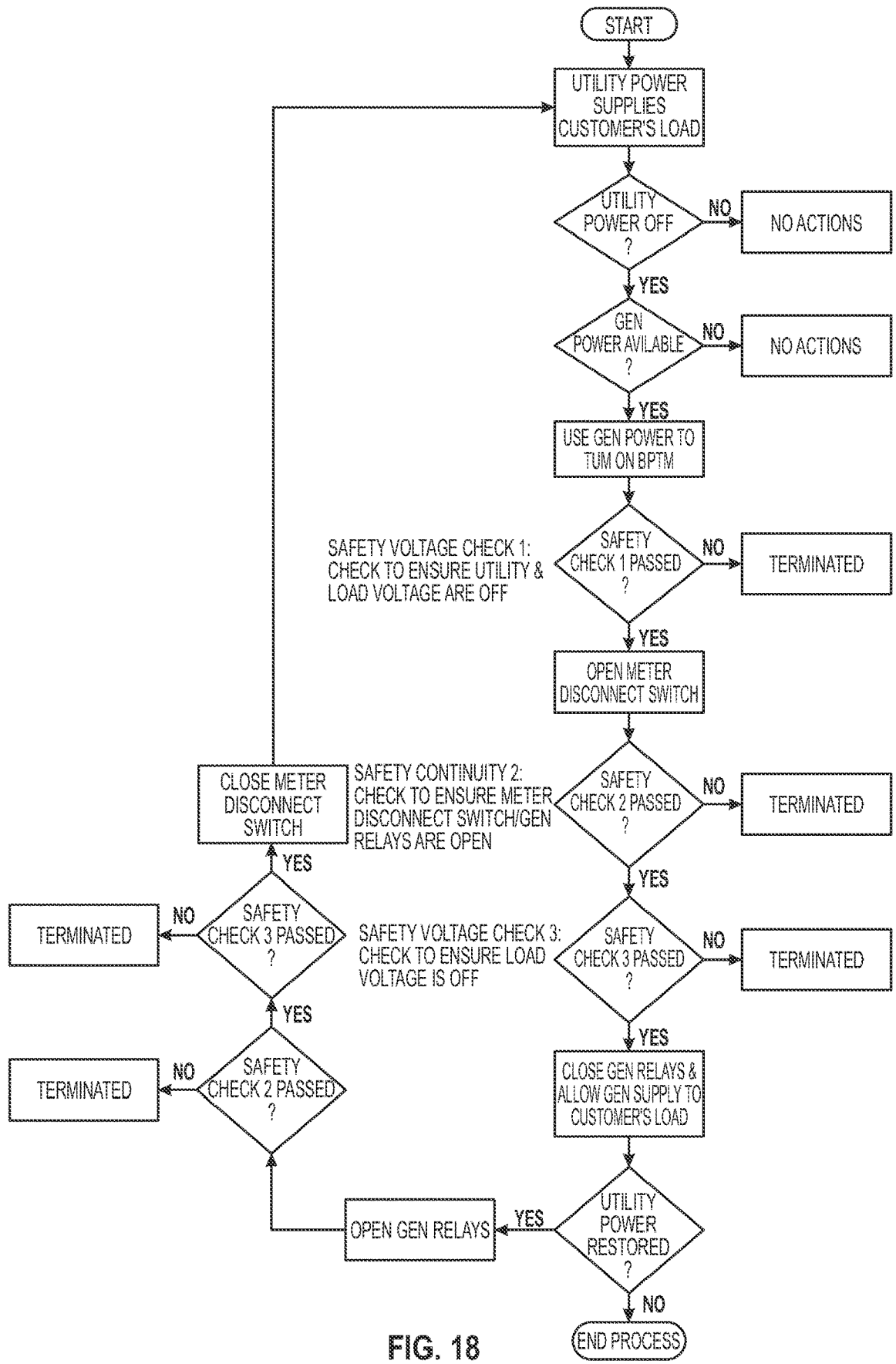
FIG. 18 shows a firmware flowchart according to some embodiments.

FIG. 17 depicts a simplified wiring diagram where the system provides automatic switching between 4 power sources according to some embodiments. In some embodiments, backup power sources 1-4 are one or more of photovoltaic (PV), home battery, electric vehicle (EV), or fuel powered generator (e.g., combustion driven). Those of ordinary skill would understand that sources 1-4 can be any source of electrical power according to some embodiments. FIG. 18 shows a firmware flowchart according to some embodiments.

Figure 19:
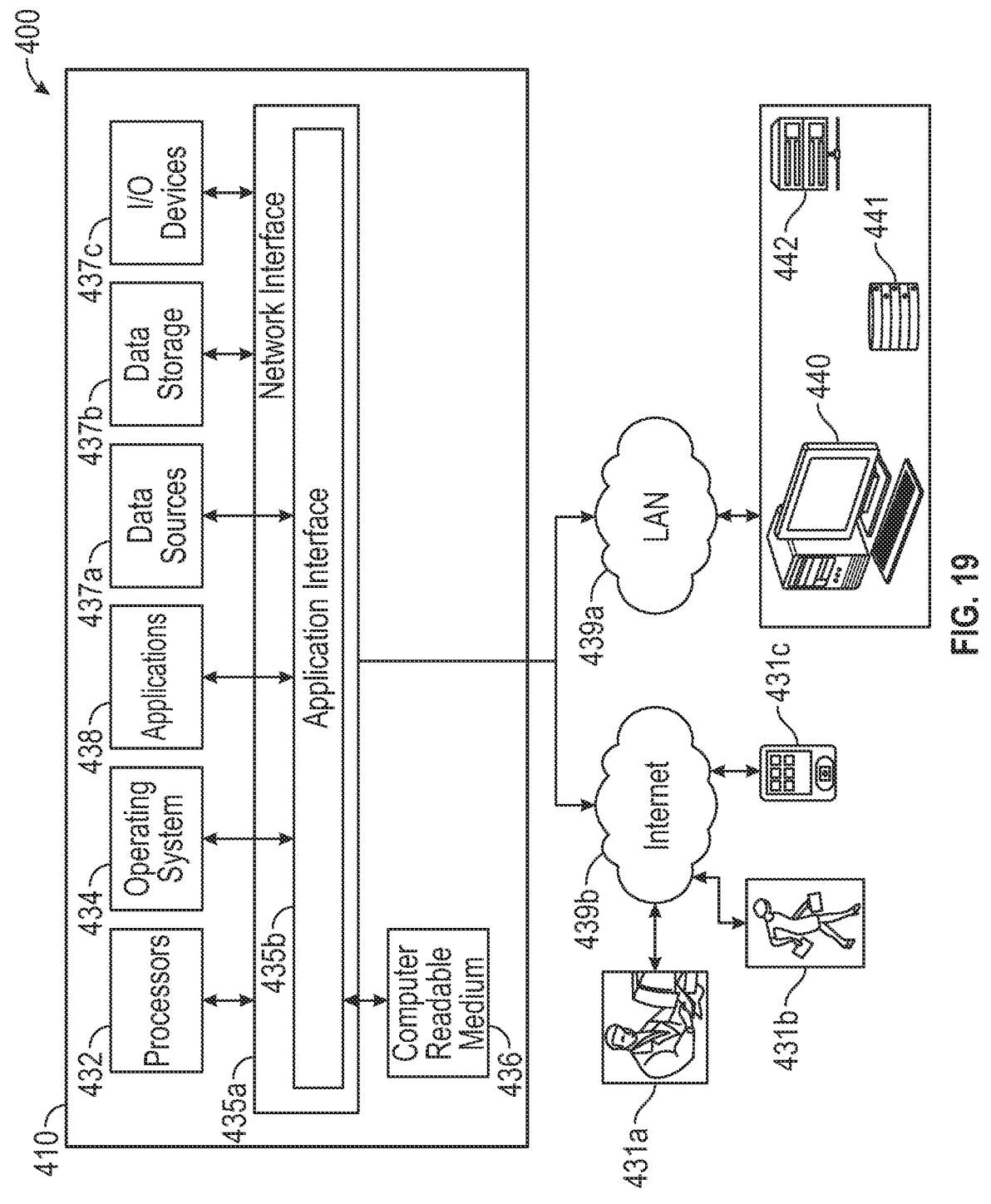

FIG. 19 illustrates a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 432. In some embodiments, the at least one processor 432 can reside in, or coupled to, one or more conventional server platforms (not shown). In some embodiments, the computer system 410 can include a network interface 435a and an application interface 435b coupled to the least one processor 432 capable of processing at least one operating system 434. Further, in some embodiments, the interfaces 435a, 435b coupled to at least one processor 432 can be configured to process one or more of the software modules (e.g., such as enterprise applications 438). In some embodiments, the software application modules 438 can include server-based software and can operate to host at least one user account and/or at least one client account and operate to transfer data between one or more of these accounts using the at least one processor 432.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 432. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network ("LAN") 439a and/or an internet coupled network 439b (e.g., such as a wireless internet). In some embodiments, the networks 439a, 439b can include wide area networks ("WAN"), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 442 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439b. In some embodiments, the user can comprise a mobile user 431b coupled to the computer system 410. In some embodiments, the user 431b can connect using any mobile computing 431c to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

Figure 21:
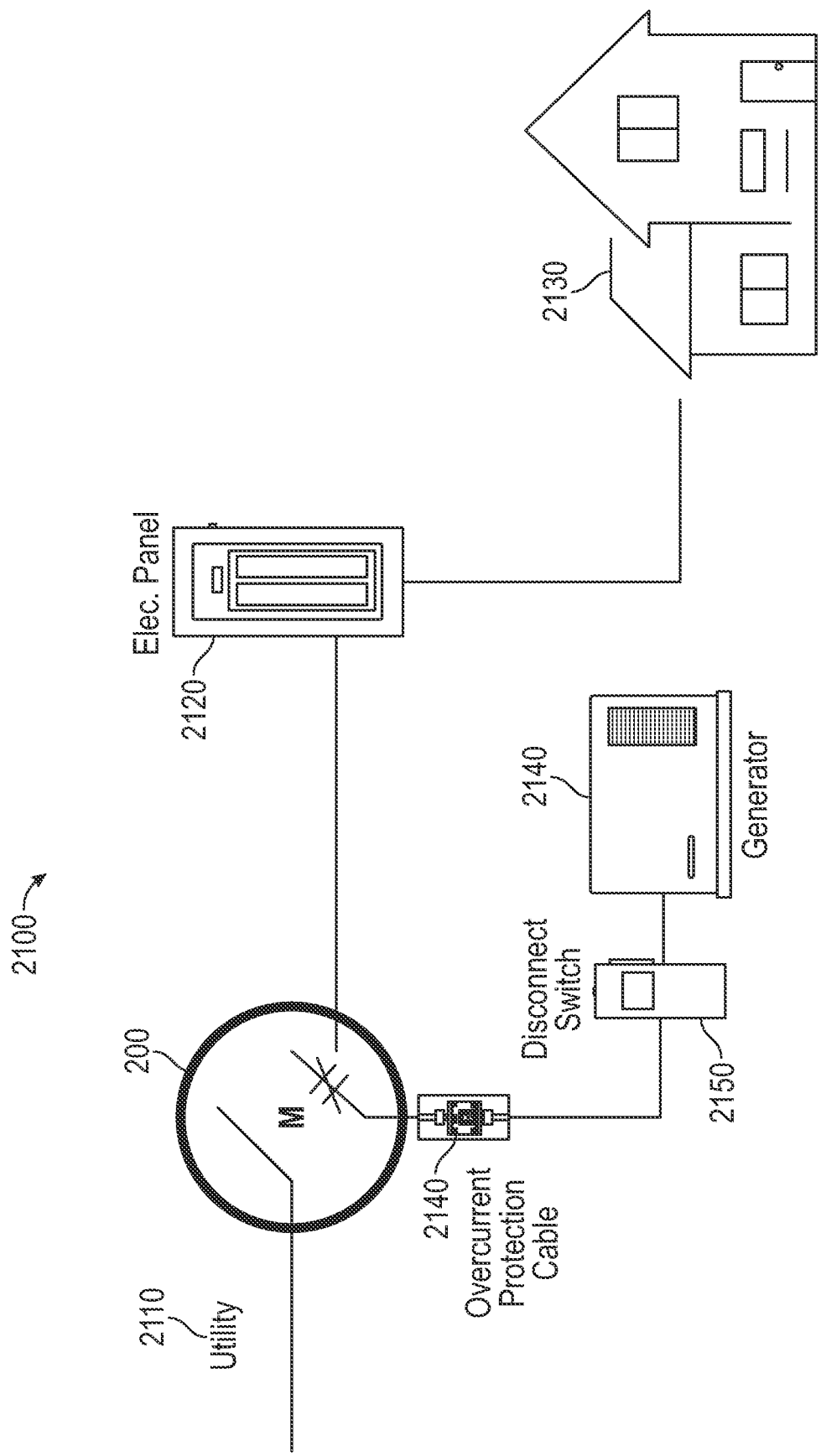
FIG. 21 shows a simplified BPTM system 2100 wiring diagram according to some embodiments.
Figure 22:
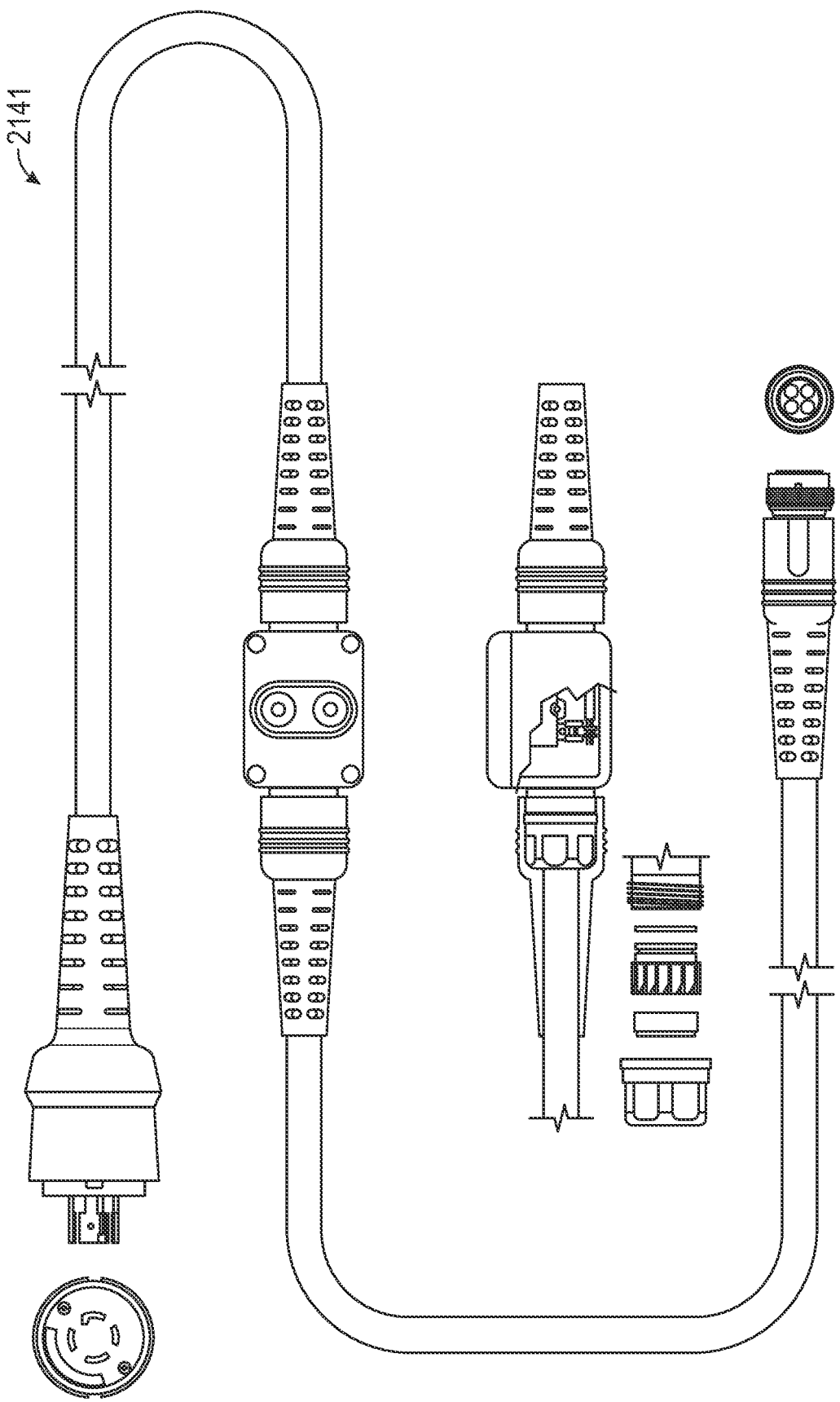
FIG. 22 illustrates a first non-limiting example of an overcurrent protection cable according to some embodiments.

FIG. 21 shows a BPTM system 2100 simplified wiring diagram according to some embodiments. In some embodiments, the BPTM 200 is configured to receive electricity from a utility 2110 (e.g., a power plant) and/or a generator 2140 and deliver the electricity to an electrical panel 2120 where it is then distributed to one or more electrical loads 2130 (e.g., televisions, refrigerators, air conditioners, lights, etc.). In some embodiments, the system 2100 includes one or more disconnect switches 2150 configured to isolate one or more generators 2140 from the BPTM 200. In some embodiments, the system 2100 includes one or more overcurrent protection cables 2140 coupled to one or more generators 2140. In some embodiments, each overcurrent protection cable 2140 comprises in-line circuitry configured to protect the BPTM 200 from an overload condition that could cause an excessive or dangerous temperature rise within the generator 2140 and/or the BPTM 200. FIG. 22 illustrates a first non-limiting example of an overcurrent protection cable 2141 according to some embodiments. FIG. 23 a second non-limiting example of an overcurrent protection cable 2142 according to some embodiments.

The subject matter described herein are directed to technological improvements to the field of electrical power supply by providing a meter configured to switch between multiple power sources to eliminate the need for separate junction boxes and/or panels. The disclosure also describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the USPTO Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

We claim:
1. A An assembly comprising:
an integrated backup power transfer system comprising:
   a utility meter housing,
   a circuit control board,
   a utility power connection configured to connect to utility power, and
   one or more backup power connections;
   a socket adaptor connected to the utility meter housing:
wherein the circuit control board comprises one or more utility contacts configured to isolate the utility power connection from an electrical load;
wherein the circuit control board comprises one or more backup power contacts configured to isolate the one or more backup power connections from the electrical load within the socket adaptor;
wherein the circuit control board comprises one or more sensors configured to detect a presence of the utility power at the utility power connection and/or backup power at the one or more backup power connections; and
wherein the socket adaptor is configured to directly couple to one or more backup power sources.
2. The assembly of claim 1,
further comprising multiple generator circuitry;
wherein the multiple generator circuitry is configured to enable the circuit control board to draw power from two or more of the one or more backup power connections simultaneously.
3. The assembly of claim 1,
further comprising a transfer switch selection and control module;
wherein the transfer switch selection and control module is configured to enable a user to select which of the one or more backup power connections to automatically supply power to the circuit control board.
4. The assembly utility meter of claim 3,
wherein the transfer switch selection and control module is configured to enable the user to choose a sequence for delivering electrical power from the utility power connection and/or the one or more backup power connections.

5. The assembly of claim 4,
wherein the transfer switch selection and control module is configured to enable the user to complete an electrical connection between two or more of the one or more backup power connections in parallel.
6. The assembly of claim 1,
further comprising a push button panel;
wherein the push button panel is located on a side of the socket adaptor; and
wherein the push button panel comprises one or more indicator lights configured to indicate an electrical state of the assembly.
7. The assembly of claim 6,
wherein the one or more indicator lights indicate:
   when the one or more backup power connections are in use;
   when the utility power connection is in use; and/or
   when the utility power is available.
8. The assembly of claim 1,
further comprising a thermo sensor;
wherein the thermo sensor is configured to detect an abnormal temperature condition within the utility meter housing.
9. The assembly of claim 1,
wherein the utility power comprises electricity from an electrical grid configured to supply the electricity to multiple electrical meters.
10. An assembly comprising:
a utility meter housing,
a socket adaptor connected to the utility meter housing;
a control circuit,
a utility provided power connection, and
one or more backup power connections within the socket adaptor;
wherein the control circuit comprises one or more sensors configured to detect a presence of utility provided electricity at the utility provided power connection and backup power electricity at the one or more backup power connections; and
wherein the control circuit is configured to control a disconnect switch motor in the utility meter housing.
11. The assembly of claim 10,
wherein the control circuit is configured to deliver the backup power electricity to the one or more sensors when both the utility provided power connection and the one or more backup power connections are both isolated from an electrical load by the control circuit.
12. The assembly of claim 11,
wherein the one or more sensors are configured to continue to receive electrical power from the one or more backup power connections upon loss of the utility provided electricity.
13. The assembly of claim 10,
further comprising multiple generator circuitry configured to enable the control circuit to simultaneously supply electricity from two or more of the one or more backup power connections to an electrical load.
14. The assembly of claim 10,
further comprising a transfer switch selection and control module within the utility meter housing;
wherein the transfer switch selection and control module is configured to enable a user to select which of the utility provided power connection and/or the one or more backup power connections provides electricity to an electrical load.

15. The assembly of claim 14,
wherein the transfer switch selection and control module is configured to enable the user to choose a sequence for selecting which of the utility provided power connection and/or the one or more backup power connections supplies electricity to the electrical load.

16. The assembly of claim 15,
wherein the transfer switch selection and control module is configured to enable a user to select a delivery of electricity from the one or more backup power connections in parallel.

17. The assembly of claim 10,
wherein the backup power electricity is supplied from one or more of photovoltaic electrical source, a battery electrical source, and/or a fossil fuel electrical power source.

18. The assembly of claim 10,
further comprising a thermo sensor;
wherein the thermo sensor is configured to detect an abnormal temperature condition.

19. The assembly of claim 10,
wherein an abnormal temperature condition includes arcing.

20. An assembly comprising:

a utility meter, a socket adaptor, a control circuit, a utility provided power connection, and one or more backup power connections within the socket adaptor;

wherein the control circuit comprises one or more sensors configured to detect a presence of utility provided electricity at the utility provided power connection and backup power electricity at the one or more backup power connections;

wherein the control circuit is configured to control a disconnect switch motor in the utility meter;

wherein the control circuit is configured to sense and switch between multiple backup power sources; and wherein the utility meter is configured to record and/or transmit data usage from one or more of the multiple backup power sources.

\* \* \* \* \*